United States Patent
Van Der Merwe et al.

(10) Patent No.: US 9,546,323 B2
(45) Date of Patent: Jan. 17, 2017

(54) PROCESS FOR INTEGRATION OF PARAFFINIC FROTH TREATMENT HUB AND A BITUMEN ORE MINING AND EXTRACTION FACILITY

(75) Inventors: Shawn Van Der Merwe, Calgary (CA); Tom Hann, Onoway (CA)

(73) Assignee: FORT HILLS ENERGY L.P., Calgary (Alberta) (CA)

( * ) Notice: Subject to any disclaimer, the term of this patent is extended or adjusted under 35 U.S.C. 154(b) by 555 days.

(21) Appl. No.: 13/982,066

(22) PCT Filed: Jan. 25, 2012

(86) PCT No.: PCT/CA2012/000075
§ 371 (c)(1),
(2), (4) Date: Jul. 26, 2013

(87) PCT Pub. No.: WO2012/100336
PCT Pub. Date: Aug. 2, 2012

(65) Prior Publication Data
US 2013/0313886 A1    Nov. 28, 2013

(51) Int. Cl.
*C10G 1/04*    (2006.01)
*B03B 9/02*    (2006.01)
(Continued)

(52) U.S. Cl.
CPC . *C10G 1/04* (2013.01); *B03B 9/02* (2013.01); *C08L 95/00* (2013.01); *C10G 1/045* (2013.01);
(Continued)

(58) Field of Classification Search
CPC .............. C10G 1/04; C10G 1/045; B03B 9/02
See application file for complete search history.

(56) References Cited

U.S. PATENT DOCUMENTS

| 181,668 A | 8/1876 | Gregg et al. |
|---|---|---|
| 654,965 A | 7/1900 | Franke |

(Continued)

FOREIGN PATENT DOCUMENTS

| CA | 918091 A1 | 1/1973 |
|---|---|---|
| CA | 918588 A1 | 1/1973 |

(Continued)

OTHER PUBLICATIONS

Andrews et al. "Great Canadian Oil Sands Experience in Commercial Processing of Athabasca Tar Sands" American Chemical Society San Francisco Meeting Apr. 2-5, 1968, p. F5-F18.
(Continued)

*Primary Examiner* — Brian McCaig
(74) *Attorney, Agent, or Firm* — Baker & Hostetler LLP

(57) ABSTRACT

A process for regionalization of mining bitumen-containing oil sands ore for extraction and conversion to produce dry bitumen comprises operating multiple separate oil sands ore mining and extraction facilities or in situ thermal recovery facilities, to produce separate bitumen froth streams; operating a regional paraffinic froth treatment (PFT) hub for receiving a portion of each of the separate bitumen froth streams and treating the bitumen froth streams to produce the dry bitumen; optionally providing a portion of the dry bitumen stream to the bitumen upgrading facility and another portion of the dry bitumen stream to a bitumen market pipeline or remote upgrading facility; and optionally comprising regionalization of water distribution where by-product waters are recovered from the PFT hub and the upgrading facilities and distributed to the mining and extraction facilities for use as extraction processing water to produce the bitumen froth streams.

49 Claims, 6 Drawing Sheets

(51) Int. Cl.
*C08L 95/00* (2006.01)
*B03D 1/24* (2006.01)

(52) U.S. Cl.
CPC ......... *B03D 1/247* (2013.01); *B03D 2203/006* (2013.01); *C10G 2300/205* (2013.01); *C10G 2300/206* (2013.01); *C10G 2300/4081* (2013.01); *Y02P 70/34* (2015.11)

(56) References Cited

U.S. PATENT DOCUMENTS

| | | | |
|---|---|---|---|
| 1,085,135 A | 1/1914 | Kelly, Jr | |
| 1,147,356 A | 7/1915 | Allen | |
| 1,159,044 A | 11/1915 | Kelly, Jr | |
| 1,201,558 A | 10/1916 | Cobb | |
| 1,254,562 A | 1/1918 | Allen | |
| 1,261,671 A | 4/1918 | Zachert | |
| 1,494,375 A | 5/1924 | Reilly | |
| 1,754,119 A | 4/1930 | Pink | |
| 1,777,535 A | 10/1930 | Stratford | |
| 2,010,008 A | 8/1935 | Bray | |
| 2,047,989 A | 7/1936 | William | |
| 2,091,078 A | 8/1937 | McKittrick et al. | |
| 2,111,717 A | 3/1938 | Young | |
| 2,188,013 A | 1/1940 | Pilat et al. | |
| 2,240,008 A | 4/1941 | Atwell | |
| 2,410,483 A | 11/1946 | Dons et al. | |
| 2,853,426 A | 9/1958 | Peet | |
| 2,868,714 A | 1/1959 | Gilmore | |
| 3,081,823 A | 3/1963 | Constantikes | |
| 3,220,193 A | 11/1965 | Sttohmeyer, Jr. | |
| 3,271,293 A | 9/1966 | Clark | |
| 3,278,415 A | 10/1966 | Doberenz et al. | |
| 3,291,569 A | 12/1966 | Rossi | |
| 3,575,842 A | 4/1971 | Simpson | |
| 3,705,491 A | 12/1972 | Foster-Pegg | |
| 3,779,902 A | 12/1973 | Mitchell et al. | |
| 3,808,120 A | 4/1974 | Smith | |
| 3,901,791 A | 8/1975 | Baillie | |
| 3,929,625 A | 12/1975 | Lucas | |
| 3,954,414 A | 5/1976 | Samson, Jr. et al. | |
| 3,957,655 A | 5/1976 | Barefoot | |
| 4,013,542 A | 3/1977 | Gudelis et al. | |
| 4,035,282 A | 7/1977 | Stuchberry et al. | |
| 4,115,241 A | 9/1978 | Harrison et al. | |
| 4,116,809 A | 9/1978 | Kizior | |
| 4,120,775 A | 10/1978 | Murray et al. | |
| 4,140,620 A | 2/1979 | Paulett | |
| 4,209,422 A | 6/1980 | Zimmerman et al. | |
| 4,210,820 A | 7/1980 | Wittig | |
| 4,230,467 A | 10/1980 | Buchwald et al. | |
| 4,251,627 A | 2/1981 | Calamur | |
| 4,284,242 A | 8/1981 | Randell | |
| 4,314,974 A | 2/1982 | Libby et al. | |
| 4,315,815 A | 2/1982 | Gearhart | |
| 4,321,147 A | 3/1982 | McCoy et al. | |
| 4,324,652 A | 4/1982 | Hack | |
| 4,342,657 A | 8/1982 | Blair | |
| 4,346,560 A | 8/1982 | Rapier | |
| 4,395,330 A | 7/1983 | Auboir et al. | |
| 4,410,417 A | 10/1983 | Miller et al. | |
| 4,425,227 A | 1/1984 | Smith | |
| 4,461,696 A | 7/1984 | Bock et al. | |
| 4,470,899 A | 9/1984 | Miller et al. | |
| 4,495,057 A | 1/1985 | Amirijafari et al. | |
| 4,514,305 A | 4/1985 | Filby | |
| 4,518,479 A | 5/1985 | Schweigharett et al. | |
| 4,532,024 A | 7/1985 | Haschke et al. | |
| 4,539,093 A | 9/1985 | Friedman et al. | |
| 4,545,892 A | 10/1985 | Cymbalisty et al. | |
| 4,572,781 A | 2/1986 | Krasuk et al. | |
| 4,584,087 A | 4/1986 | Peck | |
| 4,609,455 A | 9/1986 | Weimer et al. | |
| 4,634,520 A | 1/1987 | Angelov et al. | |
| 4,640,767 A | 2/1987 | Zajic et al. | |
| 4,644,974 A | 2/1987 | Zingg | |
| 4,648,964 A | 3/1987 | Leto et al. | |
| 4,678,558 A | 7/1987 | Belluteau et al. | |
| 4,722,782 A | 2/1988 | Graham et al. | |
| 4,726,759 A | 2/1988 | Wegnwe | |
| 4,781,819 A | 11/1988 | Chirinos et al. | |
| 4,802,975 A | 2/1989 | Mehlberg | |
| 4,822,481 A | 4/1989 | Taylor | |
| 4,828,688 A | 5/1989 | Corti et al. | |
| 4,859,317 A | 8/1989 | Shelfantook et al. | |
| 4,888,108 A | 12/1989 | Farnand | |
| 4,906,355 A | 3/1990 | Lechnick et al. | |
| 4,929,341 A | 5/1990 | Thirumalachar et al. | |
| 4,931,072 A | 6/1990 | Striedieck | |
| 4,950,363 A | 8/1990 | Silvey | |
| 4,966,685 A | 10/1990 | Hall et al. | |
| 4,968,413 A | 11/1990 | Datta et al. | |
| 5,022,983 A | 6/1991 | Myers et al. | |
| 5,039,227 A | 8/1991 | Leung et al. | |
| 5,133,837 A | 7/1992 | Elmore et al. | |
| 5,143,598 A | 9/1992 | Graham et al. | |
| 5,186,820 A | 2/1993 | Schultz et al. | |
| 5,223,148 A | 6/1993 | Tipman et al. | |
| 5,236,577 A | 8/1993 | Tipman et al. | |
| 5,264,118 A | 11/1993 | Cymerman et al. | |
| 5,282,984 A | 2/1994 | Ashrawi | |
| 5,298,167 A | 3/1994 | Arnold | |
| 5,443,046 A | 8/1995 | White | |
| 5,558,768 A | 9/1996 | Ikura et al. | |
| 5,645,714 A | 7/1997 | Strand et al. | |
| 5,690,811 A | 11/1997 | Davis et al. | |
| 5,817,398 A | 10/1998 | Hollander | |
| 5,871,634 A | 2/1999 | Wiehe et al. | |
| 5,876,592 A | 3/1999 | Tipman et al. | |
| 5,879,540 A | 3/1999 | Zinke et al. | |
| 5,914,010 A | 6/1999 | Hood et al. | |
| 5,937,817 A | 8/1999 | Schanz et al. | |
| 5,948,241 A | 9/1999 | Owen | |
| 5,954,277 A | 9/1999 | Maciejewski et al. | |
| 5,968,349 A | 10/1999 | Duyvesteyn et al. | |
| 5,985,138 A | 11/1999 | Humphreys | |
| 5,988,198 A | 11/1999 | Neiman et al. | |
| 5,997,723 A | 12/1999 | Wiehe et al. | |
| 6,004,455 A | 12/1999 | Rendall | |
| 6,007,708 A | 12/1999 | Allcock et al. | |
| 6,007,709 A | 12/1999 | Duyvesteyn et al. | |
| 6,019,888 A | 2/2000 | Mishra et al. | |
| 6,036,748 A | 3/2000 | Wallace et al. | |
| 6,076,753 A | 6/2000 | Maciejewski et al. | |
| 6,110,359 A | 8/2000 | Davis et al. | |
| 6,120,678 A | 9/2000 | Stephenson et al. | |
| 6,159,442 A | 12/2000 | Thumm et al. | |
| 6,214,213 B1 | 4/2001 | Tipman et al. | |
| 6,355,159 B1 | 3/2002 | Myers et al. | |
| 6,358,403 B1 | 3/2002 | Brown et al. | |
| 6,361,025 B1 | 3/2002 | Cincotta et al. | |
| 6,391,190 B1 | 5/2002 | Spence et al. | |
| 6,482,250 B1 | 11/2002 | Williams et al. | |
| 6,497,813 B2 | 12/2002 | Ackerson et al. | |
| 6,523,573 B2 | 2/2003 | Robison et al. | |
| 6,566,410 B1 | 5/2003 | Zaki et al. | |
| 6,746,599 B2 | 6/2004 | Cymerman et al. | |
| 6,800,116 B2 | 10/2004 | Stevens et al. | |
| 7,152,851 B2 | 12/2006 | Cincotta | |
| 7,357,857 B2 | 4/2008 | Hart et al. | |
| 7,569,137 B2 | 8/2009 | Hyndman | |
| 7,690,445 B2 | 4/2010 | Perez-Cordova | |
| 7,749,378 B2 | 7/2010 | Iqbal et al. | |
| 7,820,031 B2 | 10/2010 | D'Alessandro et al. | |
| 7,909,989 B2 | 3/2011 | Duyvesteyn et al. | |
| 7,934,549 B2 | 5/2011 | Cimolai | |
| 8,133,316 B2 | 3/2012 | Poncelet et al. | |
| 8,141,636 B2 | 3/2012 | Speirs et al. | |
| 8,147,682 B2 | 4/2012 | Lahaie et al. | |
| 8,157,003 B2 | 4/2012 | Hackett et al. | |
| 8,252,107 B2 | 8/2012 | Esmaeili et al. | |
| 8,261,831 B2 | 9/2012 | Lockhart et al. | |
| 8,262,865 B2 | 9/2012 | Sharma et al. | |
| 8,312,928 B2 | 11/2012 | Lockhart et al. | |

(56) References Cited

U.S. PATENT DOCUMENTS

| | | | |
|---|---|---|---|
| 8,343,337 B2 | 1/2013 | Moffett et al. |
| 8,354,020 B2 | 1/2013 | Sharma et al. |
| 8,357,291 B2 | 1/2013 | Sury et al. |
| 8,382,976 B2 | 2/2013 | Moran et al. |
| 8,394,180 B2 | 3/2013 | Diaz et al. |
| 8,449,764 B2 | 5/2013 | Chakrabarty et al. |
| 8,454,821 B2 | 6/2013 | Chakrabarty et al. |
| 8,455,405 B2 | 6/2013 | Chakrabarty |
| 8,550,258 B2 | 10/2013 | Bara et al. |
| 8,585,891 B2 | 11/2013 | Lourenco et al. |
| 8,585,892 B2 | 11/2013 | Lourenco et al. |
| 2002/0043579 A1 | 4/2002 | Scheybeler |
| 2003/0089636 A1 | 5/2003 | Marchionna et al. |
| 2004/0074845 A1 | 4/2004 | Hagino et al. |
| 2004/0256325 A1 | 12/2004 | Frankiewicz |
| 2005/0150816 A1 | 7/2005 | Gaston |
| 2005/0150844 A1 | 7/2005 | Hyndman et al. |
| 2006/0065869 A1 | 3/2006 | Chipman et al. |
| 2006/0138055 A1 | 6/2006 | Garner et al. |
| 2006/0196812 A1 | 9/2006 | Beetge et al. |
| 2007/0125719 A1 | 6/2007 | Yarbrough |
| 2007/0180741 A1* | 8/2007 | Bjornson ............ B03B 9/02 37/403 |
| 2007/0284283 A1 | 12/2007 | Duyvesteyn et al. |
| 2008/0000810 A1 | 1/2008 | Garner et al. |
| 2008/0185350 A1 | 8/2008 | Remesat et al. |
| 2008/0210602 A1 | 9/2008 | Duyvesteyn |
| 2009/0134059 A1 | 5/2009 | Myers et al. |
| 2009/0200210 A1 | 8/2009 | Hommema |
| 2009/0200688 A1 | 8/2009 | Cincotta |
| 2009/0294328 A1 | 12/2009 | Iqbal |
| 2009/0321322 A1 | 12/2009 | Sharma |
| 2009/0321324 A1 | 12/2009 | Sharma |
| 2010/0006474 A1 | 1/2010 | Gaston et al. |
| 2010/0076236 A1 | 3/2010 | Van Heuzen et al. |
| 2010/0078306 A1 | 4/2010 | Alhazmy |
| 2010/0089800 A1 | 4/2010 | MacDonald et al. |
| 2010/0096297 A1 | 4/2010 | Stevens et al. |
| 2010/0126395 A1 | 5/2010 | Gauthier |
| 2010/0126906 A1 | 5/2010 | Sury |
| 2010/0133149 A1 | 6/2010 | O'Connor et al. |
| 2010/0147516 A1 | 6/2010 | Betzer-Zilevitch |
| 2010/0155293 A1 | 6/2010 | Verstraete et al. |
| 2010/0155304 A1 | 6/2010 | Ding et al. |
| 2010/0206772 A1 | 8/2010 | Keppers |
| 2010/0243534 A1 | 9/2010 | Ng et al. |
| 2010/0258477 A1 | 10/2010 | Kukkonen et al. |
| 2010/0258478 A1 | 10/2010 | Moran et al. |
| 2010/0264068 A1 | 10/2010 | Ikebe et al. |
| 2010/0276341 A1 | 11/2010 | Speirs et al. |
| 2010/0276983 A1 | 11/2010 | Dunn et al. |
| 2010/0282642 A1 | 11/2010 | Kan |
| 2010/0298173 A1 | 11/2010 | Smith et al. |
| 2010/0320133 A1 | 12/2010 | Page et al. |
| 2011/0005750 A1 | 1/2011 | Boerseth et al. |
| 2011/0011769 A1 | 1/2011 | Sutton et al. |
| 2011/0061610 A1 | 3/2011 | Speirs et al. |
| 2011/0062090 A1 | 3/2011 | Bara |
| 2011/0089013 A1 | 4/2011 | Sakurai et al. |
| 2011/0100931 A1 | 5/2011 | Lake et al. |
| 2011/0127197 A1 | 6/2011 | Blackbourn et al. |
| 2011/0146164 A1 | 6/2011 | Haney et al. |
| 2011/0174683 A1 | 7/2011 | Cui et al. |
| 2011/0219680 A1 | 9/2011 | Wilkomirsky Fuica |
| 2011/0233115 A1 | 9/2011 | Moran et al. |
| 2011/0265558 A1 | 11/2011 | Feimer et al. |
| 2011/0284428 A1 | 11/2011 | Adeyinka et al. |
| 2012/0000830 A1 | 1/2012 | Monaghan et al. |
| 2012/0000831 A1 | 1/2012 | Moran et al. |
| 2012/0029259 A1 | 2/2012 | McFarlane et al. |
| 2012/0043178 A1 | 2/2012 | Kan |
| 2012/0074044 A1 | 3/2012 | McFarlane |
| 2012/0074045 A1 | 3/2012 | Stauffer et al. |
| 2012/0145604 A1 | 6/2012 | Wen |
| 2012/0175315 A1 | 7/2012 | Revington et al. |
| 2012/0217187 A1 | 8/2012 | Sharma et al. |
| 2012/0288419 A1 | 11/2012 | Esmaeili et al. |
| 2013/0043165 A1 | 2/2013 | Revington et al. |
| 2013/0081298 A1 | 4/2013 | Bugg et al. |
| 2013/0140249 A1 | 6/2013 | Sury et al. |
| 2013/0168294 A1 | 7/2013 | Chakrabarty et al. |
| 2013/0345485 A1 | 12/2013 | Duerr et al. |
| 2014/0001101 A1 | 1/2014 | Van Der Merwe et al. |
| 2014/0011147 A1 | 1/2014 | Van Der Merwe |
| 2014/0048408 A1 | 2/2014 | Van Der Merwe et al. |
| 2014/0048450 A1 | 2/2014 | Van Der Merwe et al. |
| 2014/0076785 A1 | 3/2014 | Penner et al. |
| 2014/0083911 A1 | 3/2014 | Van Der Merwe et al. |

FOREIGN PATENT DOCUMENTS

| | | |
|---|---|---|
| CA | 1027501 A1 | 3/1978 |
| CA | 1055868 | 6/1979 |
| CA | 1059052 A1 | 7/1979 |
| CA | 1072474 A1 | 2/1980 |
| CA | 1081641 A1 | 7/1980 |
| CA | 1111782 A1 | 11/1981 |
| CA | 1165712 A1 | 4/1984 |
| CA | 1237689 A1 | 6/1988 |
| CA | 1245990 A1 | 12/1988 |
| CA | 1247550 | 12/1988 |
| CA | 1249414 A1 | 1/1989 |
| CA | 1263331 A1 | 11/1989 |
| CA | 1267860 A1 | 4/1990 |
| CA | 1272975 A1 | 8/1990 |
| CA | 2012305 A1 | 9/1990 |
| CA | 2029795 A1 | 5/1991 |
| CA | 1291957 C | 11/1991 |
| CA | 1293465 C | 12/1991 |
| CA | 2021185 A1 | 1/1992 |
| CA | 2053016 A1 | 5/1992 |
| CA | 2053086 A1 | 4/1993 |
| CA | 2055213 A1 | 5/1993 |
| CA | 2075108 A1 | 1/1994 |
| CA | 2098656 A1 | 12/1994 |
| CA | 2123076 A1 | 11/1995 |
| CA | 2165865 A1 | 6/1997 |
| CA | 2174801 | 10/1997 |
| CA | 2188064 A1 | 4/1998 |
| CA | 2191517 A1 | 5/1998 |
| CA | 2200899 A1 | 9/1998 |
| CA | 2232929 A1 | 9/1998 |
| CA | 2149737 C | 3/1999 |
| CA | 2217300 A1 | 3/1999 |
| CA | 2254048 A1 | 5/1999 |
| CA | 2195604 C | 11/1999 |
| CA | 2350907 A1 | 5/2000 |
| CA | 2272045 A1 | 11/2000 |
| CA | 2304972 A1 | 10/2001 |
| CA | 2350001 A1 | 12/2002 |
| CA | 2353109 A1 | 1/2003 |
| CA | 2387257 A1 | 11/2003 |
| CA | 2527058 A1 | 3/2004 |
| CA | 2425840 A1 | 10/2004 |
| CA | 2454942 A1 | 7/2005 |
| CA | 2455011 A1 | 7/2005 |
| CA | 2726122 A1 | 7/2005 |
| CA | 2750837 A1 | 7/2005 |
| CA | 2750845 A1 | 7/2005 |
| CA | 2750934 A1 | 7/2005 |
| CA | 2750936 A1 | 7/2005 |
| CA | 2750939 A1 | 7/2005 |
| CA | 2750995 A1 | 7/2005 |
| CA | 2751587 A1 | 7/2005 |
| CA | 2751773 A1 | 7/2005 |
| CA | 2799354 A1 | 7/2005 |
| CA | 2799400 A1 | 7/2005 |
| CA | 2799739 A1 | 7/2005 |
| CA | 2520943 A1 | 4/2006 |
| CA | 2490734 A1 | 6/2006 |
| CA | 2502329 A1 | 9/2006 |
| CA | 2521248 A1 | 3/2007 |
| CA | 2524110 A1 | 4/2007 |
| CA | 2526336 A1 | 5/2007 |

(56) References Cited

FOREIGN PATENT DOCUMENTS

| | | |
|---|---|---|
| CA | 2567185 A1 | 4/2008 |
| CA | 2610122 A1 | 5/2008 |
| CA | 2610124 A1 | 5/2008 |
| CA | 2573633 A1 | 7/2008 |
| CA | 2673961 A1 | 7/2008 |
| CA | 2582059 A1 | 9/2008 |
| CA | 2588043 A1 | 11/2008 |
| CA | 2606312 A1 | 4/2009 |
| CA | 2610052 A1 | 5/2009 |
| CA | 2616036 A1 | 6/2009 |
| CA | 2654611 A1 | 8/2009 |
| CA | 2630392 A1 | 11/2009 |
| CA | 2669059 A1 | 12/2009 |
| CA | 2638120 A1 | 1/2010 |
| CA | 2673981 A1 | 1/2010 |
| CA | 2673982 A1 | 1/2010 |
| CA | 2641294 A1 | 4/2010 |
| CA | 2655852 A1 | 4/2010 |
| CA | 2683374 A1 | 4/2010 |
| CA | 2643893 A1 | 5/2010 |
| CA | 2647855 A1 | 7/2010 |
| CA | 2649928 A1 | 7/2010 |
| CA | 2652355 A1 | 8/2010 |
| CA | 2653032 A1 | 8/2010 |
| CA | 2653058 A1 | 8/2010 |
| CA | 2689684 A1 | 8/2010 |
| CA | 2657360 A1 | 9/2010 |
| CA | 2657801 A1 | 10/2010 |
| CA | 2661579 A1 | 10/2010 |
| CA | 2711136 A1 | 10/2010 |
| CA | 2666025 A1 | 11/2010 |
| CA | 2708416 A1 | 12/2010 |
| CA | 2674246 A1 | 1/2011 |
| CA | 2708048 A1 | 1/2011 |
| CA | 2678818 A1 | 3/2011 |
| CA | 2701317 A1 | 3/2011 |
| CA | 2717406 A1 | 4/2011 |
| CA | 2729457 A1 | 7/2011 |
| CA | 2733862 A1 | 7/2011 |
| CA | 2705055 A1 | 11/2011 |
| CA | 2768852 A1 | 11/2011 |
| CA | 2748477 A1 | 3/2012 |
| CA | 2752558 A1 | 3/2012 |
| CA | 2730467 A1 | 8/2012 |
| CA | 2735311 A1 | 9/2012 |
| CA | 2737410 A | 10/2012 |
| CA | 2740935 A | 11/2012 |
| CN | 1187300 A | 7/1998 |
| EP | 0059106 A2 | 9/1982 |
| GB | 587798 A | 5/1947 |
| GB | 2044796 A | 10/1980 |
| GB | 2145730 A | 4/1985 |
| JP | S56150407 A | 11/1981 |
| JP | S57200402 A | 12/1982 |
| JP | S6285415 U | 5/1987 |
| RU | 2065455 C1 | 8/1996 |
| RU | 2078095 C1 | 4/1997 |
| RU | 2096438 C1 | 11/1997 |
| WO | 2007102819 A1 | 9/2007 |
| WO | 2009111871 A1 | 9/2009 |
| WO | 2010088388 A1 | 8/2010 |

OTHER PUBLICATIONS

Prosonix, "PSX Steam Jet Diffuser . . . Technology That Makes a Difference", PSX Jet Diffuser 20110209.
Prosonix, "Sparging Efficiency vs. Direct Steam Injection", TB-6 Sparging Efficiency & Performance 20101210.
Shell Canada Limited, Application for Approval of the Jackpine Mine—Phase 1, ERCB application No. 1271285, May 2002.
Dispersion Technology, Inc., "Model DT-1201 . . . Acoustic and electro-acoustic spectrometer", Particle size and zeta potential measurement.
Rahmani et al., "Settling Properties of of Asphaltene Aggregates", Abstract, Energy Fuels, 2005, 19 (3), pp. 1099-1108.
Peramanu et al., "Flow loop apparatus to study the effect of solvent, temperature and additives on asphaltene precipiation" Journal of Petroleum Science and Engineering, vol. 23, Issue 2, Aug. 1999, pp. 133-143.
Andrews et al. "Great Canadian Oil Sands Experience in Commercial Processing of Athabasca Tar Sands" American Chemical Society San Francisco Meeting Apr. 2-5 1968, p. F5-F18.
Mitchell et al. "The solubility of asphaltenes in hydrocarbon solvents" Fuel, 1973, N. 02, vol. 52, p. 149-152.
Kemp, "Pinch Analysis and Process Integration, A User Guide on Process Integration for the Efficient Use of Energy", Second edition, Elsevier 2007.
Svreck et al "Successfully Specify Three-Phase Separators" Chemical Engineering Progress, Sep. 1994, p. 29-40.
Svreck et al. "Design Two-Phase Separators within the Right Limits" Chemical Engineering Progress, Oct. 1993, p. 53-60.
Fu et al."New technique for determination of diffusivities of volatile hydrocarbons in semi-solid bitumen", Fuel, 1979, vol. 58, August, pp. 557-560.
Kamoun et al."High Speed Shadowgraphy Investigations of Superheated Liquid Jet Atomization", ILASS-Americas 22nd Annual Conference on Liquid Atomization and Spray Systems, Cincinnati Ohio, May 2010.
Duan et al.'s "Numerical Analyses of Flashing Jet Structure and Droplet Size Characteristics"Journal of Nuclear Science and Technology, 2006, vol. 43, No. 3, p. 285-294.
Sou et al., "Effects of Cavitation in a Nozzle on liquid Jet atomization" International Journal of Heat and Mass Transfer; vol. 50, p. 3575-3582, 2007.
Ransom et al., "The relaps choke flow model and application to a large scale flow test", the American Society of Mechanical Engineers, Heat Transfer Division, 1980, Saratoga, New York.
Power,"Froth Treatment: Past, Present &Future" Oil Sand Symposium, University of Alberta, May 3-5, 2004.
Rahmani, "Shear-Induced Growth of Asphaltene Aggregates" Oil Sand Symposium, University of Alberta, May 4, 2004.
Paul et al. "Handbook of Industrial Mixing: Science and Practice" Wiley Interscience 2004, p. 391-477.
Blevins "Applied fluid dynamics handbook", Van Nostrand Reinhold Company 1984, p. 80-83.
Wu et al., "Experimental study on steam plume and temperature distribution for sonic jet" J. Phys.: Conf.Ser. 147 2009, 012079.
Yeon et al., "An Experimental Investigation of Direct Condensation of Steam Jet in Subcooled Water" Journal of Korean Nuclear Society vol. 29, No. 1, pp. 45-57, Feb. 1997.
Long et al., "Structure of water/solids/asphaltenes aggregates and effect of mixing temperature on settling rate in solvent-diluted bitumen" Fuel 2004, vol. 83, p. 823-832.
Rahimi et al., "Partial Upgrading of Athabasca Bitumen Froth by Asphaltene Removal", Unitar International Conference on Heavy Crude and Tar Sands, No. 1998.074, p. 1-8.
Hoehenberger, "Water Treatment, Cycle Chemistry, Boiler Operation and Related Problems/Failures on Steam Generator Systems > 30 bar", TÜV SÜD Industry Services, 2006, p. 1-14.
Schroyer, "Understand the Basics of Steam Injection Heating", Chemical Engineering Progress, Hydro-Thermal Corporation, May 1997, p. 1-4.
Prosonix, "PSX Steam Jet Diffuser . . .Technology That Makes a Difference", PSX Jet Diffuser 20110209.
Prosonix, "ProSonix Technical Bulletin", TB-4 Liquid & Steam Pressure Relationship.
Prosonix, "PSX Technical Bulletin", TB-7 Internally Modulated Steam Control 0210.
Prosonix, "Sparging Efficiency vs. Direct Steam Injection", TB-6 Sparging Efficiency & Performance Dec. 10, 2010.
Siemens, "Pictures of the Future", Spring 2006, Power Plants—Siemens Global Website, http://www.siemens.com/innovation/en/publikationen/publications_pof/pof_spring_2006/infrastructures_articles/power_plants.htm.
George, "Mining for Oil", Scientific American, Mar. 1998, p. 84-85.

(56) References Cited

OTHER PUBLICATIONS

Speight, "Deasphalting and Dewaxing Processes", The Chemistry and Technology of Petroleum, Fourth Edition, Chapter 19, CRC Press 2006.
Jeribi et al., "Adsorption Kinetics of Asphaltenes at Liquid Interfaces", Journal of Colloid and Interface Science, vol. 256, Issue 2, Dec. 15, 2002, pp. 268-272.
Branan, "Pocket Guide to Chemical Engineering" Elsevier Science & Technology Books, Nov. 1999.
Perry, "Perry's Chemical Engineers' Handbook" (7th Ed.), 1997.
Clarke et al., "Asphaltenes precipitation from Cold Lake and Athabasca bitumens", Petroleum Science and Technology, 1998, 16:3-4, p. 287-305.
Al-Atar, "Effect of Oil Compatibility and Resins/Asphaltenes Ratio on Heat Exchanger Fouling of Mixtures Containing Heavy Oil", Master Degree Thesis report, the University of British Columbia, Feb. 2000.
Gearhart, "Rose® process offers energy savings for solvent extraction", Proceedings from the Fifth Industrial Energy Technology Conference vol. Ii, Houston, Tx, Apr. 17-20, 1983, p. 823-835.
Clarke et al., "Asphaltene precipitation: detection using heat transfer analysis, and inhibition using chemical additives" Fuel, vol. 78, Issue 7, May 1997, p. 607-614.
Shell Canada Limited, Application for Approval of the Jackpine Mine- Phase 1, ERCB application No. 1271285, May 2002.
Imperial Oil Ressources Ventures Limited, Application for the Imperial Oil Resources Ventures Limited (Imperial Oil) and ExxonMobil Canada Properties (ExxonMobil Canada) Kearl Oil Sands Project—Mine Development (Kearl Project), ERCB Application No. 1408771, Jul. 12, 2005.
Shell Canada Limited, Application for the Approval of Muskeg River Mine Project, ERCB Application No. 970588, Dec. 19, 1997.
Beckman Coulter, Particle Size and Size Distribution Analysis, Coulter Counter.com, pp. 1-3.
Outokumpu Technology, Slurry particle size analyzer, PSI 200 TM, 2006, pp. 1-8.
Johnson, Particle size distribution in clays, Clays and Clay Minerals, pp. 89-91.
Buckley et al., Solubility of the Least-Soluble Asphaltenes, Asphaltenes, Heavy Oils, and Petroleomics, Springer, 2007, Chapter 16, pp. 401-437.
Gerson et al., The Relation of Surfactant Properties to the Extraction of Bitumen from Athabasca Tar Sand by a Solvent-Aqueous-Surfactant Process, Chemistry for Energy, American Chemical Society, 1979, Chapter 6, pp. 66-79.
Nour et al., Characterization and Demulsification of Water-in-crude Oil Emulsions, Journal of Applied Sciences, vol. 7, issue 10, 2007, pp. 1437-1441.
Malcolmson et al., In-Line Particle Size Measurements for Cement and Other Abrasive Process Environments, for Presentation at the IEEE/PCA 40th Cement Industry Technical Conference, 1998, pp. 1-13.
Bui et al., "Modelling of Viscous Resuspension Using a One-Field Description of Multiphase Flows", Third International Conference on CFD in the Minerals and Process Industries, 2003 pp. 265-268.
Dispersion Technology, Inc., "Model DT-1201 . . .Acoustic and electro-acoustic spectrometer", Particle size and zeta potential measurement.
CSIRO Minerals, UltraPS—Ultrasonic Particle Size Analyser, www.minerals.csiro.au.
Wedd, "Determination of Particle Size Distributions Using Laser Diffraction", Educ.Reso. for Part. Techn. 032Q-Wedd, pp. 1-4.
Rahmani et al., "Settling Properties of of Asphaltene Aggregates", Abstract, Energy Fuels, 2005, 19 (3), pp. 1099—1108.
Rahmani et al., "Fractal structure of asphaltene aggregates", Abstract, Journal of Colloid and Interface Science, vol. 285, Issue 2, May 15, 2005, pp. 599-608.
A John Brooks Website, Spraying pumping filtering, Automated Retractable Nozzle System, FluidHandlingSolutions.com.
Liang et al., "Experimental and Analytical Study of Direct Contact Condensation of Steam in Water" Nucl. Eng. Des., 147, Issue 3, Apr. 1994, pp. 425-435.
Peramanu et al., "Flow loop apparatus to study the effect of solvent, temperature and additives on asphaltene precipitation" Journal of Petroleum Science and Engineering, vol. 23, Issue 2, Aug. 1999, pp. 133-143.
William L. Luyben, "Heat-Exchanger Bypass Control", Ind. Eng. Chem. Res. 2011, 50, 965-973.
Dutta-B, "Principles of Mass Transfer and Separation Processes", p. 344, 2009.
Schaschke, Carl. (2014). Dictionary of Chemical Engineering. Oxford University Press. p. 67. Online version available at:http://app.knovel.com/hotlink/toc/id:kpDCE00021/dictionary-chernical-engineering/dictionary-chemical- engineering.
Imran Ali, "Process Heating by Direct Steam injection", Pharmaceutical Guide; Dec. 2010.
Choung, J. at al., "Effect of Temperature on the Stability of Froth Formed in the Recycle Process Water of Oil Sands Extraction", The Canadian Journal of Chemical Engineering, vol. 82, Aug. 2004, pp. 801-806.
Wiwchar, K. et al.. "col. Flotation in an Oilsand Application", Proceedings 36th Annual Meeting of the Canadian Mineral Processors, Ottawa, Ontario, Canada, Jan. 20-22, 2004.
Cleyle, P. et al., "Column Flotation Testing at Suncor Energy Inc.", Oilsand 2006 Conference, CD, University of Alberta, Feb. 22-24, 2006.
Finch, J. et al. "Column Flotation", 1st ed. Pergamon Press, 1990, pp. 1-7, 75-79, 82-89, 148-149, 152-159.
Baczek, "Paste Thickener Designs Evolving to Higher Capacy and Efficiencies", International Minimizing Supplement to Paste Tailing Management, Mar. 2007. 16 pages.
Versteeg et al., "An Introduction to Computational Fluid Dynamics: the Finite Volume Method", 2nd Edition, Pearson Prentice Hall, First published 1995 and 2nd Edition published 2007.
Ferziger et al., "Computational Methods for Fluid Dynamics", 3rd Edition, Springer, 2002, pp, 142-151, 188-206, 226-245, 280-307, 324-328.
Hobbs, D.M., "Optimization of a State Mixer Using. Dynamical Systems Techniques", published 1998, Elsevier Science; Chemical Engineering, vol. 53, No. 18, pp. 3199-3213.
Godard, at al., "A Review of Suncor Energy's Millennium Extraction Process", Proceedings 36th Annual Meeting of the Canadian Mineral Processors, Ottawa, Ontario, Canada, Jan. 20-22, 2004, pp. 141-152.
Mankowski, et al., "Syncrude's Low Energy. Extraction Process: Commercial implementation", The British Library-"The world's knowledge", pp. 153-181.
"Choked Flow of Gases", O'Keefe Controls Co., website: www.okcc.com.

\* cited by examiner

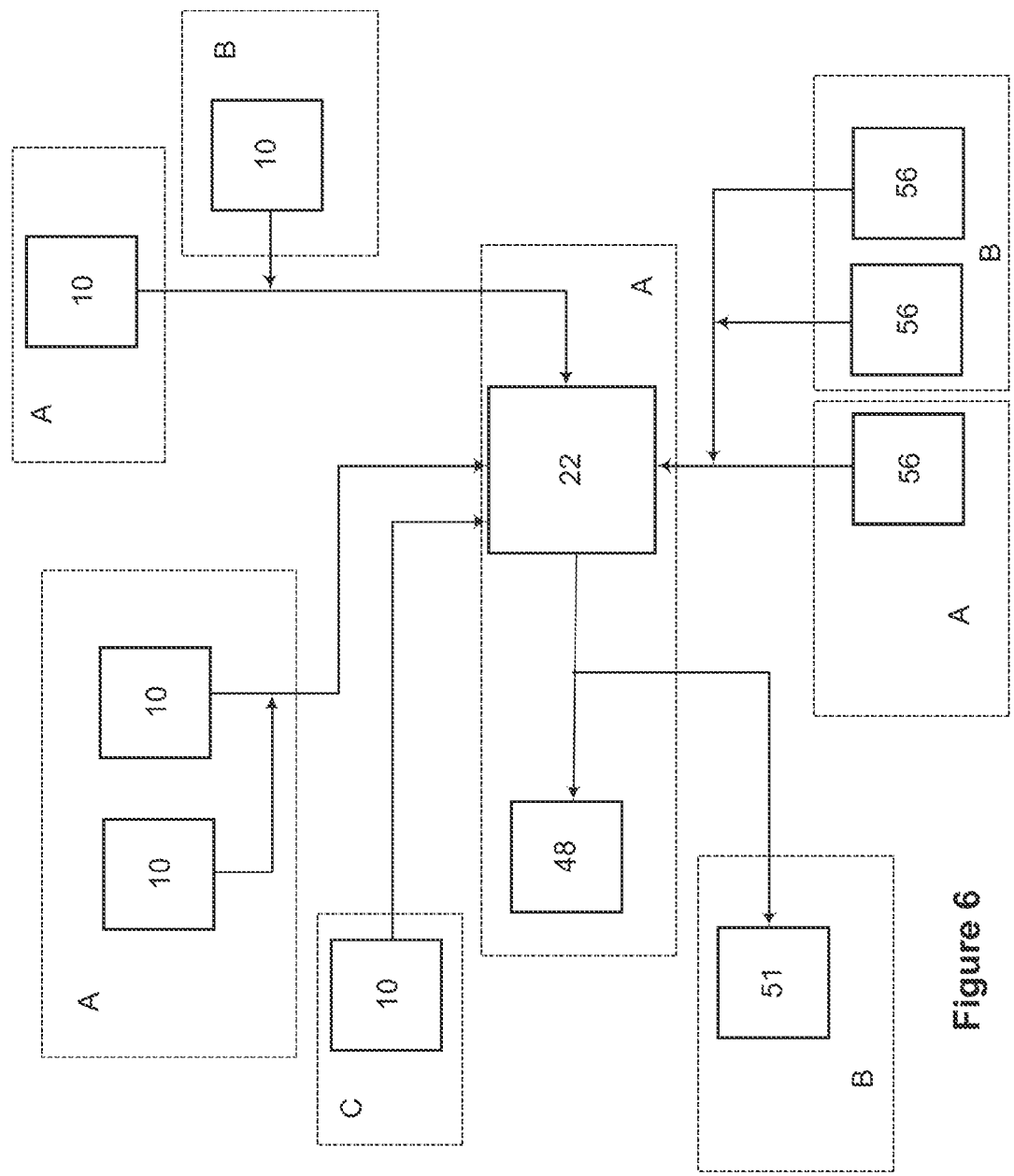

PROCESS FOR INTEGRATION OF PARAFFINIC FROTH TREATMENT HUB AND A BITUMEN ORE MINING AND EXTRACTION FACILITY

REFERENCE TO RELATED APPLICATIONS

This application is a National Stage of International Application No. PCT/CA2012/000075, filed on Jan. 25, 2012, which claims the priority to Canadian Patent Application No. 2,729,457, filed Jan. 27, 2011, the disclosures of which are incorporated by reference in their entireties.

FIELD OF THE INVENTION

The present invention relates to mining, extraction and paraffinic treatment of oil sands ore to recover bitumen therefrom.

BACKGROUND

Known oil sands operations have remote mining and extraction complexes which pipeline bitumen froth to a naphthenic froth treatment plant associated with an upgrading complex. The naphtha diluted bitumen produced by naphthenic froth treatment is processed by dedicated upgraders. Such dedicated upgraders have been located in relative proximity to naphthenic froth treatment plants and have been designed and operated for specific input bitumen from froth treatment plant, for instance having specific naphtha/bitumen ratio, water and solids content.

Paraffinic froth treatment plants that have been associated with mining and extraction complexes produce diluted bitumen product which is pipelined to a dedicated upgrader. The recovery and recycling of paraffinic solvent is via interconnecting pipelines which have centered the froth treatment process facility with mining and extraction operations.

The focus of the oil sands industry has been to add to additional plant infrastructure on a per project basis based on existing concepts. Known practices locate froth treatment process facilities adjacent to the mine/extraction facilities and has each facility developed on a stand-alone basis for the specific project which increases costs and environmental impacts on the region, for instance as each project has stand-alone tailings water management.

In addition, paraffinic froth treatment produces a dry bitumen product that has the potential to be marketed by pipeline to remote upgraders.

Furthermore, dedicated froth treatment operations can be hindered or altogether halted when either upstream or downstream process operations stall or are not available.

Safety and worker training is also a challenge in oil sands operations. Different types of operations require different types and levels of safety and training. Man-power has become a significant issue, particularly in the oil sands of northern Alberta. It is difficult to find the workforce with the proper expertise and training for the diverse assortment of operations an integrated oil sands company may require.

The known technologies for mining, extracting, froth treatment and upgrading have several drawbacks, as relates to inflexibility, unreliability and overdependence on upstream and downstream operations.

SUMMARY OF THE INVENTION

The present invention overcomes at least some of the above-mentioned drawbacks by providing a process for integrating mining and extracting operations with a paraffinic froth treatment facility.

In one embodiment, there is provided a process for regionalization of mining of bitumen-containing oil sands ore for extraction and conversion to produce dry bitumen, comprising: operating a plurality of separate oil sands ore mining and extraction facilities to produce separate bitumen froth streams; and operating a regional paraffinic froth treatment (PFT) hub for receiving at least a portion of each of the separate bitumen froth streams and treating the bitumen froth streams to produce the dry bitumen.

In one optional aspect, the plurality of separate oil sands ore mining and extraction facilities comprises at least one mobile mining and extraction facility.

In another optional aspect, the process comprises managing the relative flowrates of the bitumen froth streams to provide a generally constant bitumen froth supply to the regional PFT hub.

In another optional aspect, the process comprises operating a plurality of separate upgrading operations; and providing portions of the dry bitumen to the separate upgrading operations.

In another optional aspect, the process comprises operating a local upgrading operation proximate to the regional PFT hub; providing a first portion of the dry bitumen to the local upgrading operation; and providing a second portion of the dry bitumen to a bitumen market pipeline.

In another optional aspect, the process comprises producing a partially upgraded bitumen from the local upgrading operation; and adding a portion of the partially upgraded bitumen to the dry bitumen as diluent to facilitate pipelining.

In another optional aspect, at least one of the upgrading operations produces hot process water and wherein the process comprises recycling at least a portion of the hot process water as recycled water to at least one of the plurality of separate oil sands ore mining and extraction facilities.

In another optional aspect, the process comprises providing a regional safety hub with volatile hydrocarbon emergency capabilities proximate to the regional PFT hub.

In another optional aspect, the separate bitumen froth streams from the plurality of separate oil sands ore mining and extraction facilities have different contents of salt and water and the regional PFT hub removes the salt and water from therefrom to produce the dry bitumen.

In another optional aspect, the upgrading operation or the regional PFT hub or a combination thereof generates by-product water and the by-product water is recycled for use in at least one of the mining and extraction operations.

In another optional aspect, the process comprises providing tank storage proximate to the regional PFT hub for receiving and storing the bitumen froth streams prior to introduction into the regional PFT hub.

In another optional aspect, the process comprises operating at least one in situ bitumen recovery operation to produce an in situ bitumen froth stream; and providing the in situ bitumen froth stream to the regional PFT hub for conversion to part of the dry bitumen.

In another optional aspect, the process comprises providing pipeline infrastructure for transporting the separate bitumen froth streams to the regional PFT hub, wherein the pipeline infrastructure comprises: a first pipeline section for receiving one of the separate bitumen froth streams; a second pipeline section for receiving an other one of the separate bitumen froth streams; and a regional pipeline in fluid communication with the first pipeline section and the second pipeline section for receiving the one and the other of the separate bitumen froth streams and transporting the same to the regional PFT hub.

In another optional aspect, the process comprises locating the regional PFT hub to minimize transportation heat loss from the separate bitumen froth streams.

In another optional aspect, the process comprises locating the regional PFT hub to provide sufficient transportation mixing of the separate bitumen froth streams to facilitate paraffinic froth treatment thereof.

In another optional aspect, the process comprises locating the regional PFT hub to minimize transportation pumping energy requirements for transporting the separate bitumen froth streams.

In another optional aspect, the process comprises locating the regional PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the regional PFT hub.

In another optional aspect, the regional PFT hub produces a heated by-product hot water stream and the process comprises recycling at least a portion of the by-product hot water stream to at least one of the plurality of separate oil sands ore mining and extraction facilities.

In another optional aspect, the regional PFT hub comprises at least two parallel processing trains.

In another optional aspect, the at least two parallel processing trains are independently operable with respect to each other.

In another optional aspect, each of the processing trains comprising: a froth separation apparatus for separating the bitumen froth into high diluted bitumen and solvent diluted tailings; a tailings solvent recovery unit for separating the solvent diluted tailings into a recovered solvent component and a solvent recovered tailings component; a solvent recovery unit for separating the high diluted bitumen into the dry bitumen, recovered solvent and recovered water.

In another optional aspect, the process comprises blending the separate bitumen froth streams to produce a blended bitumen froth; and supplying the a portion of the blended bitumen froth to each of the processing trains.

In another optional aspect, the process comprises combining the separate bitumen froth streams to produce a combined bitumen froth; and storing the combined bitumen froth in a tank storage facility proximate to the regional PFT hub.

In another optional aspect, the process comprises recirculating the combined bitumen froth in the tank storage facility to blend the combined bitumen froth.

In another optional aspect, the regional PFT hub comprises treatment units for recovering additional substances from the bitumen froth. The treatment units may be configured to recover asphaltenes from the solvent diluted tailings for reuse as fuel; to recover mineral compounds; or to recover metal compounds; or a combination thereof.

In another embodiment, the invention provides a process for integration of an oil sands ore mining and extraction facility, a regional paraffinic froth treatment (PFT) hub and a bitumen upgrading facility, comprising: operating the oil sands ore mining and extraction facility to produce a bitumen froth stream; supplying the bitumen froth stream to the regional PFT hub to produce a dry bitumen stream; and providing a first portion of the dry bitumen stream to the bitumen upgrading facility and a second portion of the dry bitumen stream to a bitumen market pipeline.

In another optional aspect, the process comprises operating a plurality of the oil sands ore mining and extraction facilities to produce a plurality of the bitumen froth streams; and operating the regional paraffinic froth treatment (PFT) hub for receiving at least a portion of each of the bitumen froth streams and treating the bitumen froth streams to produce the dry bitumen.

In another optional aspect, the plurality of separate oil sands ore mining and extraction facilities comprises at least one mobile mining and extraction facility.

In another optional aspect, the process comprises managing the relative flowrates of the bitumen froth streams to provide a generally constant bitumen froth supply to the regional PFT hub.

In another optional aspect, the process comprises operating a plurality of the upgrading facilities as separate upgrading facilities; and providing portions of the dry bitumen to the separate upgrading operations.

In another optional aspect, the process comprises producing a partially upgraded bitumen from the upgrading facility; and adding a portion of the partially upgraded bitumen to the dry bitumen as diluent to facilitate pipelining.

In another optional aspect, at least one of the upgrading facilities produces hot process water and wherein the process comprises recycling at least a portion of the hot process water as recycled water to the oil sands ore mining and extraction facility.

In another optional aspect, the process comprises providing a regional safety hub with volatile hydrocarbon emergency capabilities proximate to the regional PFT hub.

In another optional aspect, the separate bitumen froth streams from the plurality of separate oil sands ore mining and extraction facilities have different contents of salt and water and the regional PFT hub removes the salt and water from therefrom to produce the dry bitumen.

In another optional aspect, the upgrading operation or the regional PFT hub or a combination thereof generates by-product water and the by-product water is recycled for use in the mining and extraction facility.

In another optional aspect, the process comprises providing tank storage proximate to the regional PFT hub for receiving and storing the bitumen froth stream prior to introduction into the regional PFT hub.

In another optional aspect, the process comprises operating at least one in situ bitumen recovery operation to produce an in situ bitumen froth stream; and providing the in situ bitumen froth stream to the regional PFT hub for conversion to part of the dry bitumen.

In another optional aspect, the process comprises locating the regional PFT hub to minimize transportation heat loss from the bitumen froth stream and the dry bitumen streams.

In another optional aspect, the process comprises locating the regional PFT hub to provide sufficient transportation mixing of the bitumen froth stream to facilitate paraffinic froth treatment thereof.

In another optional aspect, the process comprises locating the regional PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the regional PFT hub.

In another optional aspect, the regional PFT hub produces a heated by-product hot water stream and the process comprises recycling at least a portion of the by-product hot water stream to the oil sands ore mining and extraction facility.

In another optional aspect, the regional PFT hub comprises at least two parallel processing trains.

In another optional aspect, the at least two parallel processing trains are independently operable with respect to each other.

In another optional aspect, each of the processing trains comprises a froth separation apparatus for separating the bitumen froth into high diluted bitumen and solvent diluted tailings; a tailings solvent recovery unit for separating the solvent diluted tailings into a recovered solvent component and a solvent recovered tailings component; and a solvent recovery unit for separating the high diluted bitumen into the dry bitumen, recovered solvent and recovered water.

In another optional aspect, the process comprises storing the bitumen froth in a tank storage facility proximate to the regional PFT hub.

In another optional aspect, the process comprises recirculating the bitumen froth in the tank storage facility to blend the bitumen froth therein In another optional aspect, the regional PFT hub comprises treatment units for recovering additional substances from the bitumen froth.

In another optional aspect, the process comprises the treatment units are configured to recover asphaltenes from the solvent diluted tailings for reuse as fuel; to recover mineral compounds; or to recover metal compounds; or a combination thereof.

In another embodiment, the invention provides a process for integration of an oil sands ore mining and extraction facility, a regional paraffinic froth treatment (PFT) hub and bitumen upgrading facilities, comprising operating the oil sands ore mining and extraction facility to produce a bitumen froth stream; supplying the bitumen froth stream to the regional PFT hub to produce a dry bitumen stream; and providing a first portion of the dry bitumen stream to a local bitumen upgrading facility and a second portion of the dry bitumen stream to a remote bitumen upgrading facility.

In an optional aspect, the process comprises operating a plurality of the oil sands ore mining and extraction facilities to produce a plurality of the bitumen froth streams; and operating the regional paraffinic froth treatment (PFT) hub for receiving at least a portion of each of the bitumen froth streams and treating the bitumen froth streams to produce the dry bitumen. The plurality of separate oil sands ore mining and extraction facilities may comprise at least one mobile mining and extraction facility.

In another optional aspect, the process comprises managing the relative flowrates of the bitumen froth streams to provide a generally constant bitumen froth supply to the regional PFT hub.

In another optional aspect, the process comprises producing a partially upgraded bitumen from the local upgrading facility; and adding a portion of the partially upgraded bitumen to the dry bitumen as diluent to facilitate pipelining to the remote upgrading facility.

In another optional aspect, the local upgrading facility produces hot process water and wherein the process comprises recycling at least a portion of the hot process water as recycled water to the oil sands ore mining and extraction facility.

In another optional aspect, the process comprises providing a regional safety hub with volatile hydrocarbon emergency capabilities proximate to the regional PFT hub.

In another optional aspect, the separate bitumen froth streams from the plurality of separate oil sands ore mining and extraction facilities have different contents of salt and water and the regional PFT hub removes the salt and water from therefrom to produce the dry bitumen.

In another optional aspect, the local upgrading facility or the regional PFT hub or a combination thereof generates by-product water and the by-product water is recycled for use in the mining and extraction facility.

In another optional aspect, the process comprises providing tank storage proximate to the regional PFT hub for receiving and storing the bitumen froth stream prior to introduction into the regional PFT hub.

In another optional aspect, the process comprises operating at least one in situ bitumen recovery operation to produce an in situ bitumen froth stream; and providing the in situ bitumen froth stream to the regional PFT hub for conversion to part of the dry bitumen.

In another optional aspect, the process comprises locating the regional PFT hub to minimize transportation heat loss from the bitumen froth stream and the dry bitumen streams.

In another optional aspect, the process comprises locating the regional PFT hub to provide sufficient transportation mixing of the bitumen froth stream to facilitate paraffinic froth treatment thereof.

In another optional aspect, the process comprises locating the regional PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the regional PFT hub.

In another optional aspect, the regional PFT hub produces a heated by-product hot water stream and the process comprises recycling at least a portion of the by-product hot water stream to the oil sands ore mining and extraction facility.

In another optional aspect, the regional PFT hub comprises at least two parallel processing trains.

In another optional aspect, the at least two parallel processing trains are independently operable with respect to each other.

In another optional aspect, each of the processing trains comprising: a froth separation apparatus for separating the bitumen froth into high diluted bitumen and solvent diluted tailings; a tailings solvent recovery unit for separating the solvent diluted tailings into a recovered solvent component and a solvent recovered tailings component; a solvent recovery unit for separating the high diluted bitumen into the dry bitumen, recovered solvent and recovered water.

In another optional aspect, the process comprises blending the separate bitumen froth streams to produce a blended bitumen froth; and supplying the a portion of the blended bitumen froth to each of the processing trains.

In another optional aspect, the process comprises combining the separate bitumen froth streams to produce a combined bitumen froth; and storing the combined bitumen froth in a tank storage facility proximate to the regional PFT hub.

In another optional aspect, the process comprises recirculating the combined bitumen froth in the tank storage facility to blend the combined bitumen froth.

In another optional aspect, the regional PFT hub comprises treatment units for recovering additional substances from the bitumen froth. The treatment units may be configured to recover asphaltenes from the solvent diluted tailings for reuse as fuel; to recover mineral compounds; or to recover metal compounds; or a combination thereof.

In another embodiment, the invention provides a process for regionalization of water distribution in an oil sands processing operations comprising mining of bitumen-containing oil sands ore for extraction and conversion to produce dry bitumen, comprising operating an oil sands ore mining and extraction facility to produce a bitumen froth stream and tailings water; operating a regional paraffinic froth treatment (PFT) hub for receiving the bitumen froth stream to treat the bitumen froth stream to produce the dry bitumen and receiving a portion of the tailings water for cooling and heat recovery to produce heated PFT process water; operating an upgrading facility for receiving and upgrading at least a portion of the dry bitumen from the regional PFT hub, the upgrading facility producing heated upgrading process water; and distributing a portion of the heated PFT process water, the heated upgrading process water, or a combination thereof, to the oil sands ore mining and extraction facility for use as extraction processing water to produce the bitumen froth stream.

In another optional aspect, the upgrading facility is a local bitumen upgrading facility and wherein a second portion of the dry bitumen stream is supplied to a remote bitumen upgrading facility.

In another optional aspect, the process comprises producing a partially upgraded bitumen from the local upgrading operation; and adding a portion of the partially upgraded bitumen to the dry bitumen as diluent to facilitate pipelining to the remote bitumen upgrading facility.

In another optional aspect, the process comprises operating a plurality of the oil sands ore mining and extraction facilities to produce a plurality of the bitumen froth streams; and operating the regional paraffinic froth treatment (PFT) hub for receiving at least a portion of each of the plurality of the bitumen froth streams and treating the bitumen froth streams to produce the dry bitumen.

In another optional aspect, the plurality of oil sands ore mining and extraction facilities comprises at least one mobile mining and extraction facility.

In another optional aspect, the process comprises managing the relative flowrates of the bitumen froth streams to provide a generally constant bitumen froth supply to the regional PFT hub.

In another optional aspect, the process comprises providing a regional safety hub with volatile hydrocarbon emergency capabilities proximate to the regional PFT hub.

In another optional aspect, the process comprises providing the heated PFT process water, the heated upgrading process water, or the combination thereof, used in the oil sands ore mining and extraction facility, such that caustic is unnecessary for extraction in a Clark Hot Water Process.

In another optional aspect, the process comprises providing tank storage proximate to the regional PFT hub for receiving and storing the bitumen froth stream prior to introduction into the regional PFT hub.

In another optional aspect, the process comprises operating at least one in situ bitumen recovery operation to produce an in situ bitumen froth stream; and providing the in situ bitumen froth stream to the regional PFT hub for conversion to part of the dry bitumen.

In another optional aspect, the process comprises locating the regional PFT hub to minimize transportation heat loss from the bitumen froth stream and dry bitumen.

In another optional aspect, the process comprises locating the regional PFT hub to provide sufficient transportation mixing of the bitumen froth streams to facilitate paraffinic froth treatment thereof.

In another optional aspect, the process comprises locating the regional PFT hub to minimize transportation pumping energy requirements for transporting the bitumen froth streams.

In another optional aspect, the process comprises locating the regional PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the regional PFT hub.

In another optional aspect, the regional PFT hub comprises at least two parallel processing trains. In another optional aspect, the at least two parallel processing trains are independently operable with respect to each other. In another optional aspect, each of the processing trains comprising: a froth separation apparatus for separating the bitumen froth into high diluted bitumen and solvent diluted tailings; a tailings solvent recovery unit for separating the solvent diluted tailings into a recovered solvent component and a solvent recovered tailings component; a solvent recovery unit for separating the high diluted bitumen into the dry bitumen, recovered solvent and recovered water.

In another optional aspect, the process comprises blending the separate bitumen froth streams to produce a blended bitumen froth; and supplying a portion of the blended bitumen froth to each of the processing trains.

In another optional aspect, the process comprises combining the separate bitumen froth streams to produce a combined bitumen froth; and storing the combined bitumen froth in a tank storage facility proximate to the regional PFT hub.

In another optional aspect, the process comprises recirculating the combined bitumen froth in the tank storage facility to blend the combined bitumen froth.

In another optional aspect, the regional PFT hub comprises treatment units for recovering additional substances from the bitumen froth. The treatment units may be configured to recover asphaltenes from the solvent diluted tailings for reuse as fuel; to recover mineral compounds; or to recover metal compounds; or a combination thereof.

In another embodiment, the invention provides a process for regionalization of recovering bitumen from bitumen-containing oil sands formations for extraction and conversion to produce dry bitumen, comprising operating an in situ thermal bitumen recovery facility to produce an in situ bitumen froth stream; operating an oil sands ore mining and extraction facility to produce an extracted bitumen froth stream; operating a regional paraffinic froth treatment (PFT) hub for receiving at least a portion of each of the in situ bitumen froth stream and the extracted bitumen froth stream, for treatment to produce the dry bitumen.

In one optional aspect, the in situ thermal recovery facility is selected from SAGD, SAGP, ES-SAGD, VAPEX, ET-DSP, and ISC facilities.

In another optional aspect, the process comprises managing the relative flowrates of the in situ bitumen froth stream and the extracted bitumen froth stream to provide a generally constant bitumen froth supply to the regional PFT hub.

In another optional aspect, the process comprises operating a plurality of separate upgrading operations; and providing portions of the dry bitumen to the separate upgrading operations.

In another optional aspect, the process comprises operating a local upgrading operation proximate to the regional PFT hub; providing a first portion of the dry bitumen to the local upgrading operation; and providing a second portion of the dry bitumen to a bitumen market pipeline.

In another optional aspect, the process comprises producing a partially upgraded bitumen from the local upgrading operation; and adding a portion of the partially upgraded bitumen to the dry bitumen as diluent to facilitate pipelining.

In another optional aspect, the process comprises providing a regional safety hub with volatile hydrocarbon emergency capabilities proximate to the regional PFT hub.

In another optional aspect, the in situ bitumen froth stream and the extracted bitumen froth stream have different contents of salt and water and the regional PFT hub removes the salt and water from therefrom to produce the dry bitumen.

In another optional aspect, the process comprises providing tank storage proximate to the regional PFT hub for receiving and storing the in situ bitumen froth stream and the extracted bitumen froth stream prior to introduction into the regional PFT hub.

In another optional aspect, the process comprises providing pipeline infrastructure for transporting the in situ bitumen froth stream and the extracted bitumen froth stream to the regional PFT hub, wherein the pipeline infrastructure comprises a first pipeline section for receiving the in situ bitumen froth stream; a second pipeline section for receiving the extracted bitumen froth stream; and a regional pipeline in fluid communication with the first pipeline section and the second pipeline section for receiving both of the bitumen froth streams and transporting the same to the regional PFT hub.

In another optional aspect, the process comprises locating the regional PFT hub to minimize transportation heat loss from the in situ bitumen froth stream.

In another optional aspect, the process comprises locating the regional PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the regional PFT hub.

In another optional aspect, the larger confirmed bitumen reserves are mainly in situ recoverable bitumen reserves.

In another optional aspect, the regional PFT hub comprises at least two parallel processing trains. The at least two parallel processing trains may be independently operable with respect to each other. Each of the processing trains may comprise a froth separation apparatus for separating the bitumen froth into high diluted bitumen and solvent diluted tailings; a tailings solvent recovery unit for separating the solvent diluted tailings into a recovered solvent component and a solvent recovered tailings component; and a solvent recovery unit for separating the high diluted bitumen into the dry bitumen, recovered solvent and recovered water.

In another optional aspect, the process comprises blending the in situ bitumen froth stream and the extracted bitumen froth stream to produce a blended bitumen froth; and supplying the a portion of the blended bitumen froth to each of the processing trains.

In another optional aspect, the process comprises combining the in situ bitumen froth stream and the extracted bitumen froth stream to produce a combined bitumen froth; and storing the combined bitumen froth in a tank storage facility proximate to the regional PFT hub.

In another optional aspect, the process comprises recirculating the combined bitumen froth in the tank storage facility to blend the combined bitumen froth.

In another optional aspect, the regional PFT hub comprises treatment units for recovering additional substances from the bitumen froth. The treatment units may be configured to recover asphaltenes from the solvent diluted tailings for reuse as fuel; to recover mineral compounds; or to recover metal compounds; or a combination thereof.

BRIEF DESCRIPTION OF THE DRAWINGS

FIG. 6 is a process block diagram of the process according to another embodiment of the present invention.

DETAILED DESCRIPTION

Figure 1:
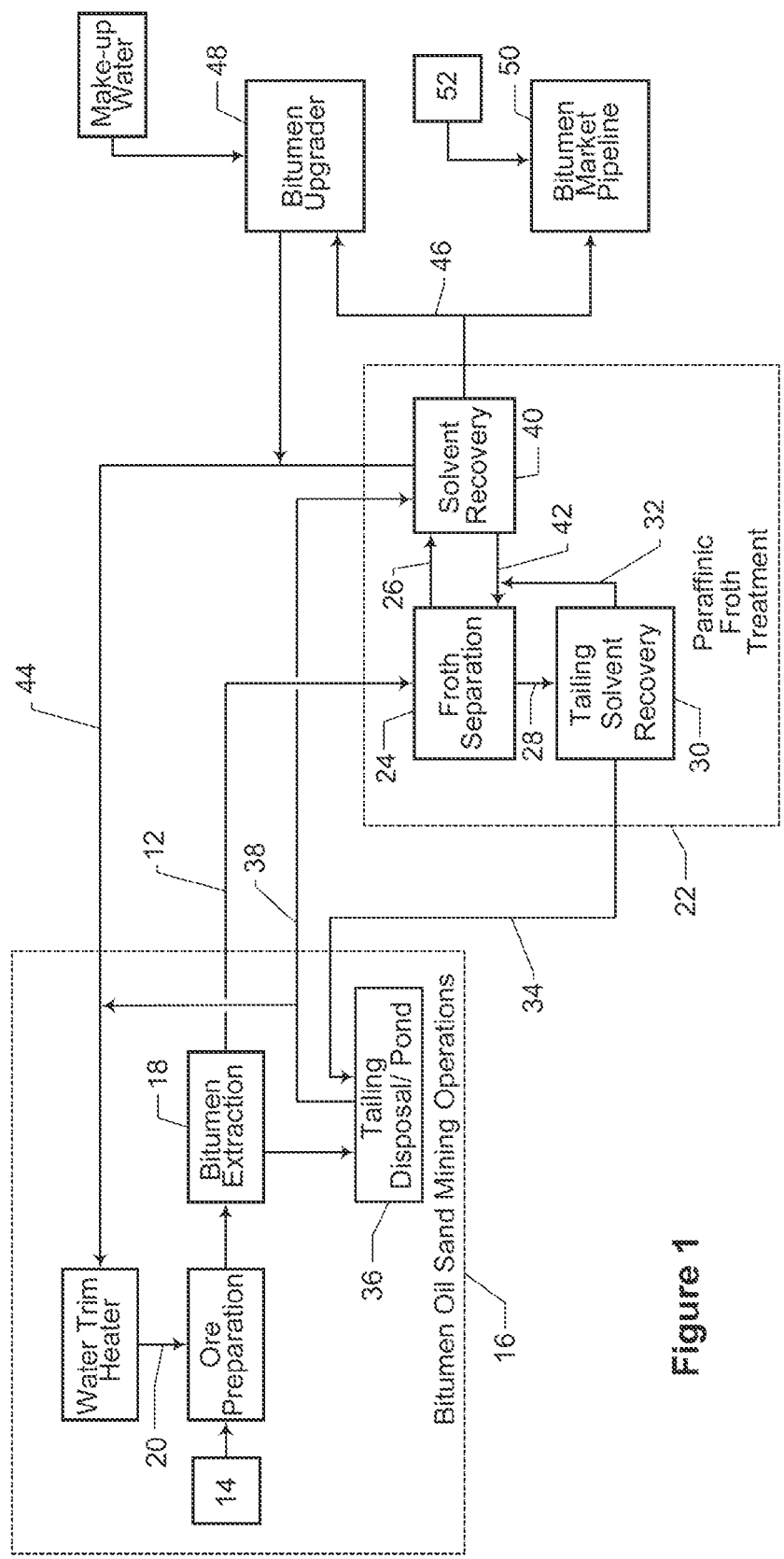
FIG. 1 is a process block diagram of the process according to an embodiment of the present invention.
Figure 2:
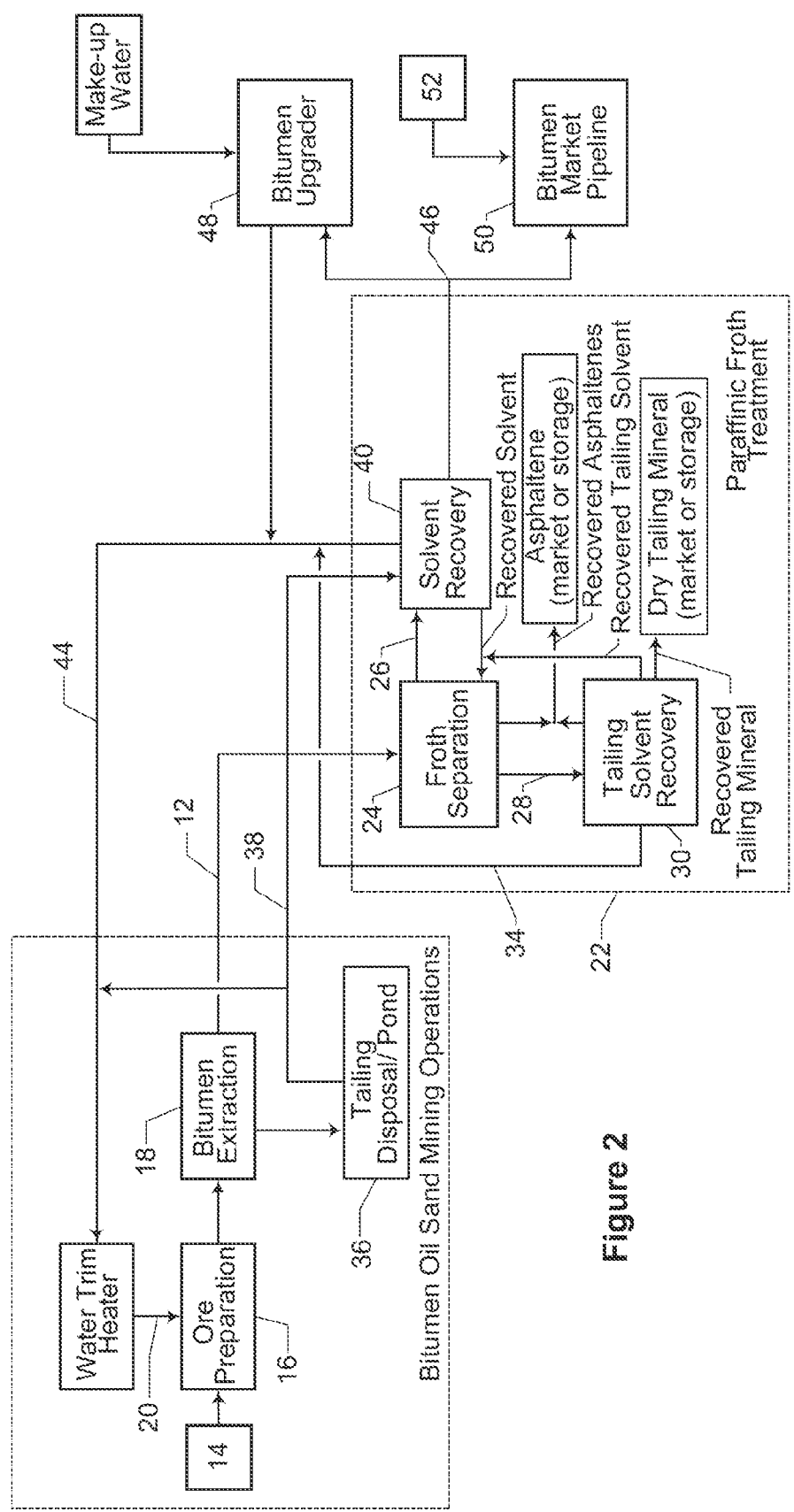
FIG. 2 is a process block diagram of the process according to another embodiment of the present invention.

Referring to FIGS. 1 and 2, a bitumen oil sands mining operation 10 is illustrated. The mining operation includes a number of steps to produce bitumen froth 12. Mined oil sands ore 14 undergoes preparation step 16 followed by extraction 18. Oil sand extraction processes are used to liberate and separate bitumen from oil sand so the bitumen can be further processed. Numerous oil sand extraction processes have been developed and commercialized using water as a processing medium. One such water extraction process is the Clark hot water extraction process, which recovers the bitumen product in the form of a bitumen froth stream. A water extraction process such as the Clark Process typically requires that mined oil sand be conditioned or prepared for extraction by being crushed to a desired lump size and then combined with water and perhaps other agents to form a conditioned slurry of water and crushed oil sand. In the Clark Process, the water used is "hot" (usually about 80° C.) and an amount of sodium hydroxide can be added to the slurry to increase the slurry pH, which enhances the liberation and separation of bitumen from the oil sands ore. There are other water extraction processes that have other temperature requirements and may include other conditioning agents which are added to the oil sand slurry. The water used to condition and prepare the oil sands ore may be recycled process water 20, which will be explained further herein below. Pipeline conditioning can also help liberation of bitumen from the oil sands ore.

The bitumen froth 12 produced by the mining operation 10 is transported by pipeline to a regional paraffinic froth treatment hub 22, which is referred to herein as a regional PFT hub. As shown in FIGS. 1 and 2, in the regional PFT hub 22, the bitumen froth is combined with paraffinic solvent and fed to a froth separation apparatus 24, which may include several froth separation units. The froth separation apparatus 24 enables separation of the paraffinic diluted froth into high diluted bitumen 26 and solvent diluted tailings 28. The solvent diluted tailings 28 are fed to a tailings solvent recovery unit 30 to remove residual paraffinic solvent from the solvent diluted tailings. The recovered paraffinic solvent 32 can be recycled back into the froth separation apparatus 24. The tailings solvent recovery unit 30 also produces solvent recovered tailings 34 which may be sent to a tailings disposal area 36 such as a pond. In an alternative embodiment as shown in FIG. 2, the solvent recovered tailings 34 may be at least partially recycled through a recycle line 38 to recover water 20 in the bitumen froth 12 for recycle and reuse as extraction process water. Disposal of stripped froth treatment tailings 34 can preferably involve intermediary treatment methods to help avoid lengthy slurry pipelines to remote ponds.

Referring now to FIGS. 1 and 2, the high diluted bitumen 26 is fed to a solvent recovery unit 40 which separates it into recovered solvent 42, recovered water 44 and hot bitumen 46. The recovered water from the solvent recovery 46 of PFT is normally a relatively small part of the overall recyclable water stream 44. Recycled pond water 38 may be used as cooling media in solvent recovery 40 and the recovered heat may be returned as extraction process water 44 to minimize the trim heating required by the process water 20 added in the ore preparation step 16.

In another preferred embodiment, the regional PFT hub 22 allows process water to be as a regional commodity, with recycling and reuse occurring between extraction sites, froth treatment, and upgrading. In one of the beneficial aspects of regional water reuse, the extraction process provides a level of conditioning to the water and chemicals build up in the system to buffer chemistry. In another of the beneficial aspects of regional water reuse, the process water derived from the regional PFT hub and upgrading is advantageous for processing and recovering bitumen in extraction operations to the point that caustic is not required and in some cases lower temperatures may be used.

Referring still to FIGS. 1 and 2, the hot bitumen 46 may be pipelined to a local bitumen upgrader 48 or a bitumen market pipeline 50 or a combination thereof. When sent to the bitumen market pipeline 50, there may be an amount of pipeline diluent 52 added to the hot bitumen 46, preferably after cooling for safe handling in the pipeline system. In some embodiments, the diluent 52 may be naphtha and may be derived from an upgrading operation. In some cases, the diluent may be paraffinic or naphthenic, and may be selected to suit downstream upgrader requirements. Naphtha diluent may be preferred for pipelining long distances for more remote upgrading and may have some advantages concerning erosion, corrosion and liquid uplift. The heat recovered from the hot bitumen may be returned into the extraction water system for reuse in bitumen extraction operations. For example, a heat receptor fluid such as process water may be fed along with the hot bitumen through a heat exchanger prior to recycling the resulting heated process water to the one or more of the extraction operations as recycled water 44.

Figure 3:
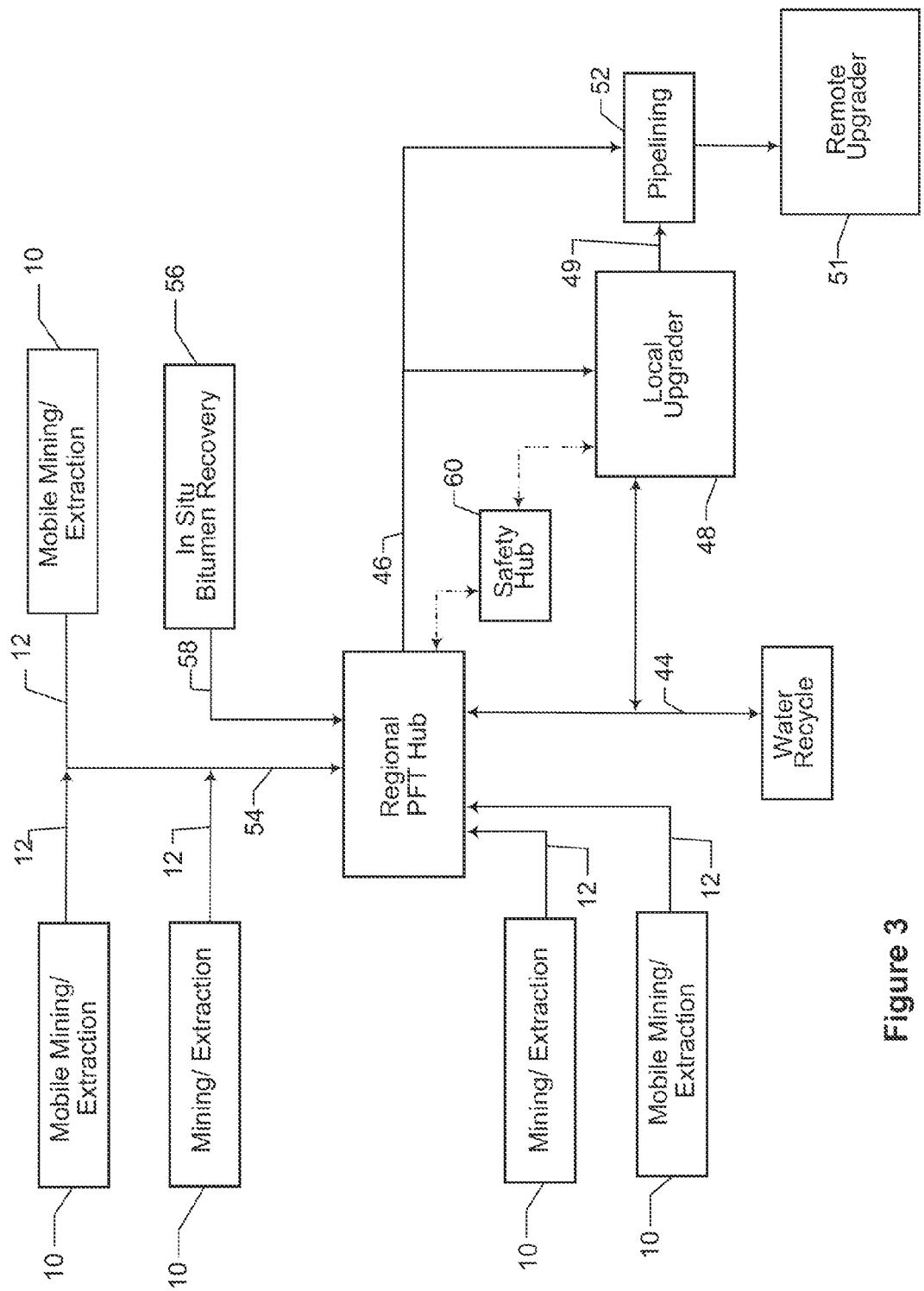
FIG. 3 is a process block diagram of the process according to yet another embodiment of the present invention.

As shown in FIG. 3, in an optional embodiment, the local upgrader 48 may produce an amount of partially upgraded bitumen 49 which is used in combination with the pipeline diluent 52 or as a replacement for the pipeline diluent or a combination thereof. The pipeline diluent 52 or partially upgraded bitumen 49 may be added to the hot bitumen 46 at a location proximate to the upgrader.

Figure 4:
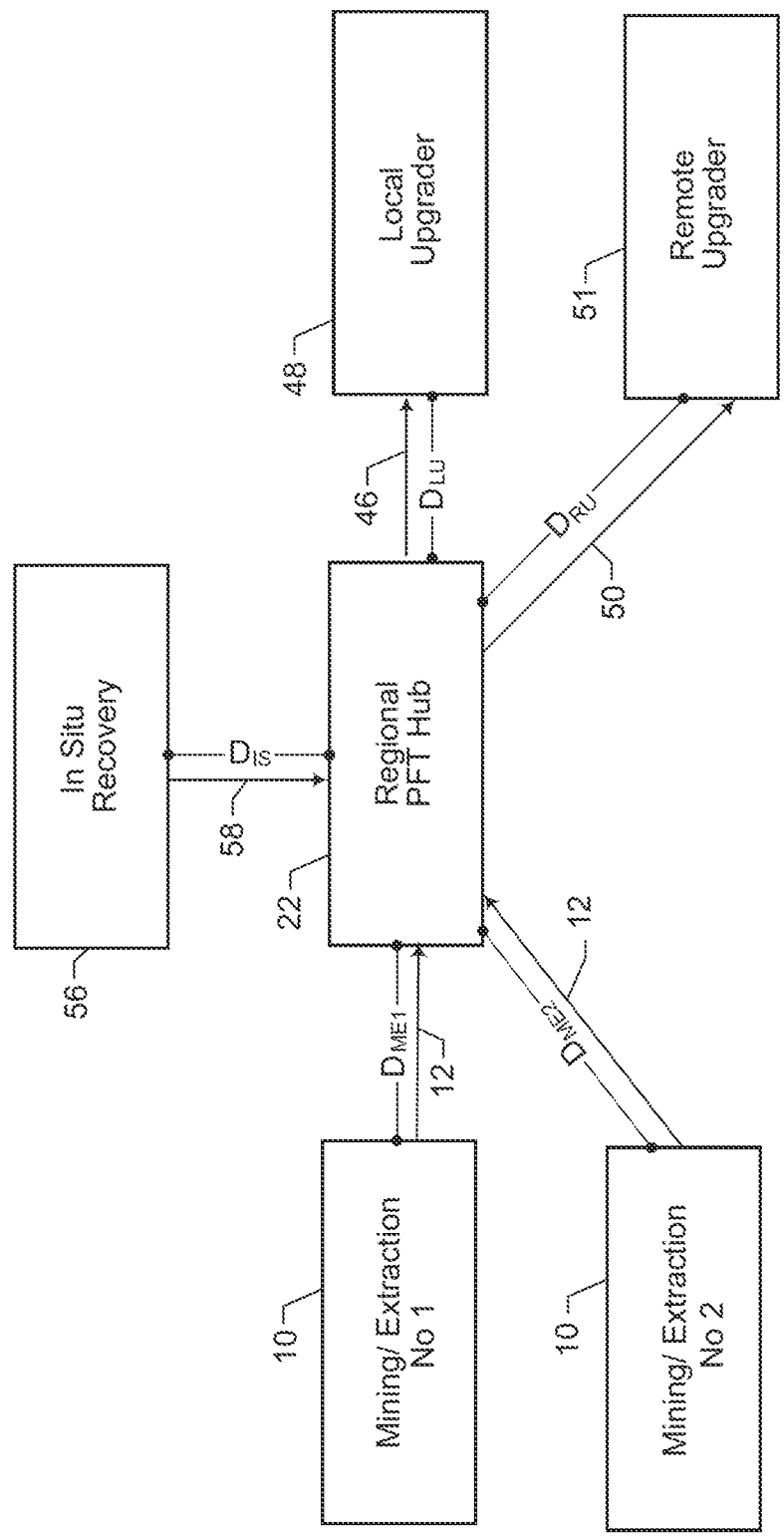
FIG. 4 is a process block diagram of the process according to another embodiment of the present invention.

Referring now to FIGS. 3 and 4, in one embodiment, hot bitumen 46 may be pipelined to a remote bitumen upgrader 51. More regarding the advantages of integrating the regional PFT hub with both local and remote bitumen upgraders will be discussed herein below.

It should be noted that FIG. 1 represents a so-called "basic" case of an embodiment of the present invention. It should be understood that the oil sand mining operations 10 may, in this figure, imply one or more operations in parallel and not necessarily on the same lease, as will be further explained in reference to FIG. 6 herein below.

Referring now to FIGS. 3 and 4, there may be multiple mining and extraction operations 10 each supplying bitumen froth to a single regional PFT hub 22. FIG. 3 shows multiple separate mining and extraction operations 10 supplying the regional PFT hub 22 with separate streams of bitumen froth 12. In terms of pipeline infrastructure, some of the mining and extraction operations may have independent pipelines transporting the bitumen froth to the regional PFT hub, while other mining and extraction operations may use common pipeline infrastructure 54. In some embodiments, a mobile mining and extraction operation may preferably have a temporary pipeline which is displaced or replaced as it moves through or along the oil sands ore body is connected to permanent pipeline infrastructure of a fixed mining and extraction operation. This allows various advantages in terms of equipment and pipeline efficiency, land use, and providing a reliable supply of bitumen froth through permanent or existing pipeline infrastructure. In some embodiments, the pipelines may be independent.

Figure 5:
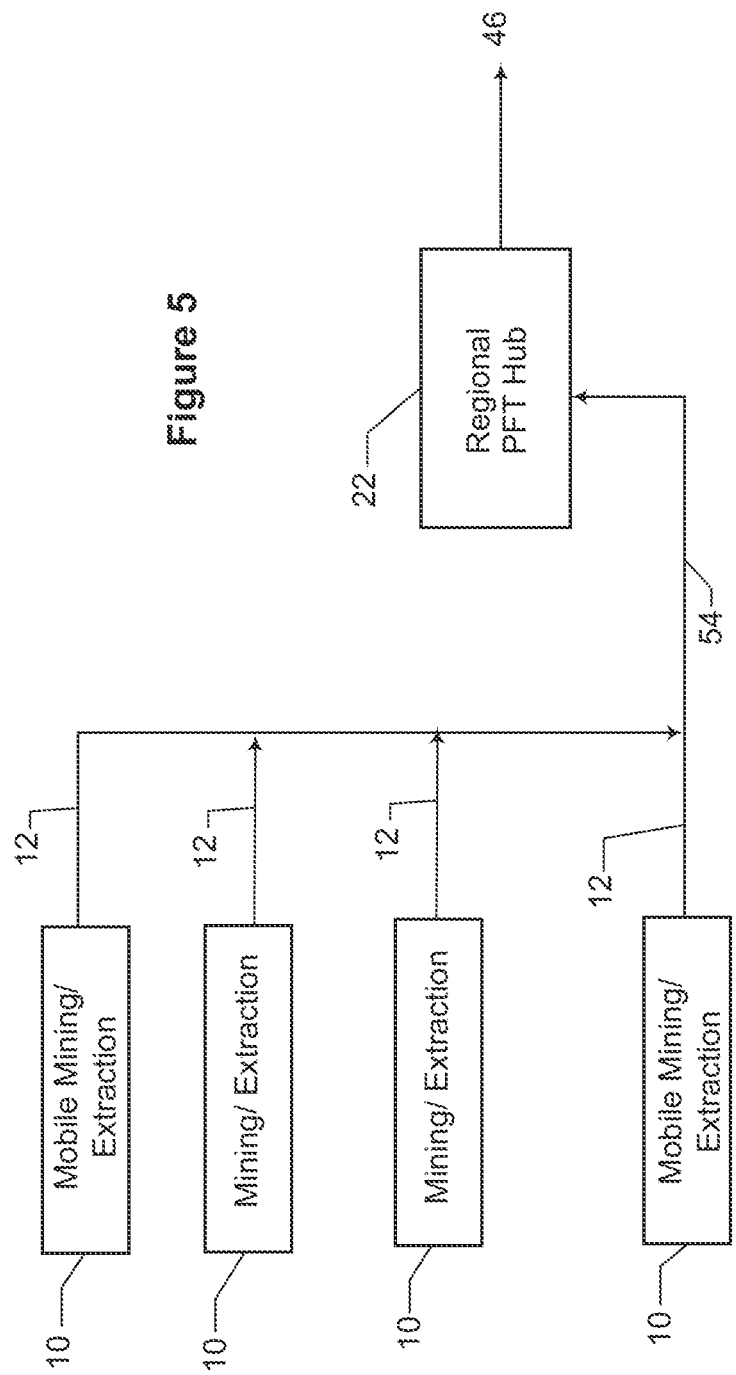
FIG. 5 is a process block diagram of the process according to yet another embodiment of the present invention.

Referring to FIG. 5, in a preferred embodiment, there are multiple mining operations each producing bitumen froth. These mining operations may have the oil sands mine supplying fixed extraction facilities or mobile mining and extraction facilities. There may be one or more mobile mining and extraction operations which supply bitumen froth to the central pipeline of a fixed mining and extraction operation. Each bitumen froth pipeline of the respective mobile mining and extraction operation may be relatively short in length and be proximate to the respective mobile mining and extraction operation. Providing multiple mobile mining and extraction operations and a fixed mining and extraction operation allows additional flexibility and reliability. In one embodiment, one mobile or fixed mining and extraction operations may be temporarily shut down, for instance to move it to a preferred location of the oil sands ore body, and another of the mobile mining and extraction operations increases production of bitumen froth to compensate for the downtime of the off-line mobile mining and extraction operation, while maintaining a reliable supply of bitumen froth to the regional PFT hub. This configuration allows for flexible planning to maintain high production and processing stability at the regional PFT hub. Alternatively, in some embodiments, the bitumen froth pipeline of the respective mobile mining and extraction operation may be independent.

Such mobile facilities may be designed for extracting and processing oil sands ore excavated at a mine face and may have an independently mobile excavating unit for excavating the ore, an independently mobile ore preparation unit for receiving and preparing a conditioned oil sand slurry from which bitumen froth may be recovered using either conventional fixed location extraction facilities or moveable extraction facilities as identified in Canadian patent application No. 2,610,122. For instance, the mobile facility may have an independently mobile ore crushing unit for receiving and crushing the excavated ore and the ore crushing unit may be adapted to follow the excavating unit. The mobile facility may also include an ore processing unit for receiving and further crushing the crushed ore and for forming a water based slurry with it. The mobile facility may also include a conveyor extending between said ore crushing unit and said ore processing unit, the conveyor having an ore receiving end for receiving ore from the ore crushing unit and an ore depositing end for depositing said ore to the ore processing unit. The mobile facility may also include various retaining units, conveyors mounted on frames provided with driven tracks, cyclones, pumps and pipeline fitting equipment to enable fluid communication with pipeline infrastructure. It should be noted that the mobile facility may also have a number of other features or different designs compared to those mentioned herein.

Still referring to FIGS. 3 and 4, there may also be one or more in situ recovery facilities 56 and corresponding pipeline infrastructure coupling it to the regional PFT hub 22 to supply in situ bitumen froth 58 thereto. In situ thermal bitumen recovery operations involve recycle and reuse of water leading to high chemical consumption to bring water and contaminants to levels acceptable to the market. In some embodiments of the present invention, the PFT hub allows processing of bitumen from this source to improve the marketability of the bitumen by, for instance, reducing asphaltenes and improving quality. The ability to interchange water is another advantage of such embodiments.

In one embodiment, in situ thermal bitumen recovery operations may produce bitumen streams having differing qualities, heat contents and chemical compositions. For instance, one situ thermal bitumen recovery operation may produce diluted cooler bitumen and another in situ thermal bitumen recovery operation may produce hotter less-diluted bitumen, both of which are supplied to the regional PFT hub. The hotter less-diluted bitumen may by in the range of about 60° C.-85° C., for example. The hotter in situ bitumen is preferably transported a shorter distance to the regional PFT hub compared to the diluted cooler bitumen, for heat efficiency purposes and, furthermore, to provide a heated input bitumen froth for processing in a high temperature froth treatment process, which may operate close to the temperature of the hotter less-diluted bitumen. The cooler diluted bitumen may be transported a further distance due to better froth lubricity and lower heat loss issues. The two in situ bitumen streams may be pre-mixed prior to froth treatment, in a mixer or common storage tank, proximate to or at the regional PFT hub. The regional PFT hub is then able to treat both bitumen streams to produce a hot bitumen with standardized quality. The PFT hub may also have a common centralized pre-treatment unit for treating certain bitumen froth derived from in situ or extraction operations which contain unwanted contaminants such as high chlorides and the like.

The regional PFT hub facility provides flexibility and reliability in bitumen production and use from oil sands mining operations. For instance, the reliability of mining and extraction systems, which must deal with the erosive nature of sand, is unlike the reliability of paraffinic froth treatment plants which have reliabilities similar to refining operations. While mining and extraction operations may be stalled or halted due to erosion-based wear and related repair or replacement downtimes, paraffinic froth treatment facilities have a different set of bottlenecks and challenges which occur at different frequencies and require different devices and procedures to maintain desired safety and operational efficiency.

Mining and extraction operations also must handle varying bitumen content in the mined ore and may experience ups and downs in bitumen froth quantity and bitumen content. In contrast, paraffinic froth treatment may be more efficiently operated with a generally constant supply of bitumen froth.

Furthermore, paraffinic froth treatment in particular involves processes using significant volumes of volatile hydrocarbons and appropriately locating the froth treatment in the region, permits a number of advantages related to the transportation and recycle of various fluids and training personnel for specialized safe operation of the facility with rapid regional response to emergency situations. Mining and extraction operations do not involve processes with significant inventories of volatile hydrocarbons and the regional location of the PFT hub facility thus reduces exposure of these personnel to associated risks of fires and explosions.

Furthermore, as mentioned hereinabove, the regional PFT hub facility can treat bitumen froth from a number of different mining and extraction operations. Specific mining and extraction operations may be optimized in scale to the specific ore body while minimizing adverse regional impacts. Process water used in the extraction process may be recycled to minimize fresh or river water inputs. A regional PFT hub supplied by multiple mining and extraction operations can reduce capital investment. One advantage of providing the regional PFT hub that is fed by multiple mining and extraction operations is ensuring an adequate supply of bitumen froth to the PFT hub. Since mining and extraction operations can produce variable quantities and qualities of bitumen froth due to variable bitumen content in the mined ore, downtimes, and other circumstances, this can lead to inadequate supply of bitumen froth to a froth treatment facility. Thus, the PFT hub's reliance on multiple sources of bitumen froth can reduce or altogether avoid downtime in froth treatment. In one embodiment, the process may also include planned shut-down, start-up or operational modifications to mining and extraction operations that are integrated into a common PFT hub, thereby allowing uninterrupted and efficient operation to process the froth into dry bitumen. For instance, a first mining and extraction operation may reduce bitumen froth output while a second mining and extraction operation may be operated to have a corresponding increase in bitumen froth output, to provide a relatively common bitumen froth supply to the common paraffinic froth treatment hub.

In addition, individual mining and extraction operations can be developed with greater independence with respect to each other. The regional PFT hub facility provides both a local market for bitumen froth and a regional market for process contaminated water.

Furthermore, mining and extraction operations using the Clark hot water process or process variations involve circulation of large volumes of hot process water. A regional PFT hub can distribute both water and heat to mining and extraction operations while minimizing costs and environmental impacts associated with dedicated operations.

The regional PFT hub facility produces a dry bitumen product that can be processed by existing bitumen upgraders or diluted with diluent for pipelining to other markets such as remote upgraders. The paraffinic froth treatment rejects water from the bitumen product and also rejects salts associated with connate water in oil sands. While chloride salts in connate waters of some oil sands supplying bitumen to initial bitumen upgraders can be low, bitumen from other oil sands ore can have a much higher chloride content, which adversely affects the reliability and safety of upgrading process unit operations. The paraffinic froth treatment facility reliably reduces the water and salt content to produce a hot bitumen product that can be efficiently handled by both local and distant upgraders irrespective of whether the bitumen froth is derived from high or low salt containing oil sands ore.

Furthermore, waste water from upgraders can be reused or integrated with water used to cool the paraffinic froth treatment plant for reuse or makeup for mining and extraction operations. Upgraders generate process contaminated water that can be advantageously used in extraction. It should be noted that heat is preferably transferred through or from process water to mining and extraction operations, which are "colder" processes requiring heat. Directing heat to colder processes results in higher efficiency as low grade heat is easier to transfer.

It should also be noted that stripped froth treatment tailings contain both hydrocarbon values such as asphaltenes, bitumen and solvent, and minerals such as titanium and zirconium, which are recoverable. For instance, the regional PFT hub facility may produces a separate asphaltene stream which may be advantageous in a regional hub setting as such a stream could be marketed or used as fuel in various integrated operations as needed.

The regional PFT hub facility produces a dry bitumen product with quality permitting both local and remote marketing of the bitumen. For instance, the rejected asphaltene in bitumen from paraffinic froth treatment permits improved yields or debottlenecking of coke rejection operations, or a combination thereof. By upgrading a portion of the hot bitumen in a local upgrader and pipelining the remainder of the hot bitumen for sale or remote upgrading, an integrated oil sands operator is able to both produce upgraded product streams for added value and obtain immediate revenue for a part of the raw hot bitumen, thus allowing for a high degree of flexibility. The proportion of hot bitumen that is locally upgraded versus pipelined to market for remote upgrading will depend on a number of factors, including the transportation infrastructure and efficiency considerations, relative market price of raw and upgraded bitumen, upgrader capacity, tank storage capacity, pipeline capacity, and so on.

Hot bitumen pipelining from a regional PFT hub facility to a local upgrader allows local marketing of bitumen with high energy integration with existing unit operations, e.g. minimizes diluent recovery currently used at the front end of existing upgraders. For instance, the heat from the hot bitumen will be used and benefitted from in the upgrading processes.

Bitumen froth pipelining permits transfer of the bitumen froth from local or remote mining and extraction facilities to the regional PFT hub. In one embodiment, there is a basic volume of bitumen froth tankage (tanks not illustrated) which is preferred to facilitate process interfaces for start-ups, shut downs and step changes in operation. The froth tankage preferably includes pump-around systems to prevent separation and promote froth blending in the tanks. Large tankage is preferred to permit longer times for operational responses to incidents. In one preferred embodiment, the process includes providing bitumen froth tank storage proximate the regional PFT hub facility and the tank storage has a volume sufficient to store excess bitumen froth received from the mining and extraction operations with which the regional PFT hub facility is integrated, in accordance with the total froth production or capacity of those mining and extraction operations. In another embodiment, the froth tank storage has a surge time between 10 and 30 hours. In another embodiment, the froth tank storage has recirculation blending to blend the bitumen froth, which can be particularly preferred when more than one sources of bitumen froth are stored in the same tank. Recirculation blending may be achieved by having a forth outlet line at the bottom of the tank, a recirculation pump in fluid communication with the forth outlet line and a return line in fluid communication between the recirculation pump and the tank. The tanks may also be blended by using a variety of agitators and mixers as known in the art of tank and vessel agitating and blending. In some embodiments, multiple bitumen froth supply lines are connected to the same tank storage unit, which in turn provides a blended froth to the regional PFT hub.

The regional PFT hub may also be designed and configured to have multiple parallel trains of settlers, tailing solvent recovery units and solvent recovery units. This multi-train configuration allows greater reliability in case one of the trains must be brought off-line or adjusted to a lower throughput. There may be two, three or more parallel trains in a single regional PFT hub. In the case of multiple bitumen froth supply sources, the overall froth throughput will be large and the PFT hub and associated tank storage may be provided to handle downtimes for one of the PFT trains while allowing sustained froth treatment.

Water transfer including hot water permits the regional reuse of process water. A basic volume of water storage (not illustrated) is desired to facilitate process interfaces for start-up and shut downs. Large tankage is preferred to permit longer times for operational responses to incidents. The storage volume is also subject to inventory or recycle water availability. The water storage facilities may be at remote extraction facilities and may have surge times of between 2 hours and 3 days, as per requirements and capacity of each given facility.

In one aspect, the regional PFT hub facility is located such that it is in relative proximity to existing or planned infrastructure that promotes work force stability, for instance via short commuting, and integrates into existing regional emergency response plans such as fire, explosion and medical response plans and the like. Another advantage of the PFT hub is to facilitate focused high-tech specialists to a central site.

Referring to FIG. 3, there may be a regional high-level safety response hub 60 located proximate to the regional PFT hub 22 and, preferably, proximate to the local upgrader 48 as well. Since upgrading and paraffinic froth treatment involve similar safety requirements and operational hazards, for instance regarding volatile hydrocarbons, it is advantageous to provide a common or central safety hub 60 for responding to emergencies and frequent training purposes. The mining and extraction operations may have their own M&E-level safety facilities.

Referring now to FIG. 4, the mining and extraction operations 10, in situ recovery operations 56, regional PFT hub 22, local upgrader 48 and remote upgrader 51 may be located at certain distances with respect to each other, to increase fluid transportation and integration efficiencies. Distances $D_{ME1}$, $D_{ME2}$, $D_{IS}$, $D_{LU}$ and $D_{RU}$ with respect to the regional PFT hub are employed based on transport efficiency of the integrated fluids between the facilities. For instance, in one embodiment $D_{ME1}$ and $D_{ME2}$ are each less than $D_{IS}$, since the in situ bitumen froth may have a higher temperature than the bitumen froth from extraction and thus shorter transport distance translates into lower heat loss. In addition, the paraffinic froth treatment process of the PFT hub is preferably operated at high temperature, such as between 60° C. and 120° C., preferably between 70° C. and 90° C., and thus thermal efficiency benefits from a hot input froth. In another embodiment, the relative distances are such that the pipeline wear is minimized due to the transportation of various fluids, such as recycle water, coarse tailings, fine tailings, volatile hydrocarbons, bitumen froth, abrasive mineral-containing streams, hot bitumen, diluted bitumen, and so on. For instance, the regional PFT hub may be located so that the abrasive mineral-containing streams are provided thereto or therefrom through a shorter pipeline than non-abrasive streams such as hot bitumen. In another embodiment, the relative distances are such that the transportation energy required to transport the various process streams is minimized. In addition, thick viscous fluids may be transported shorter distances than thinner Newtonian-like fluids. In another embodiment, the relative elevation of each operation and facility is taken into consideration. In addition, the regional PFT hub and other operations may be located such that viscous fluids that are energy-intensive to pump long distances may be transported with substantial amount of gravity assistance, thus decreasing pump demands. In addition, fine tailings associated with froth treatment are not substantially abrasive, especially compared to coarse tailings, and as fine tailings contain valuable minerals they may be provided via pipeline to a facility for recuperating those minerals. Fine tailings may also be subjected to various dewatering and drying treatments to recover water which can be reused in oil sands processing. In addition, it should be noted that bitumen froth largely overcomes energy loss through long pipelines due to a phenomenon of lubricity, in which the water contained in the bitumen froth having the right composition contacts the interior pipe walls and lubricates the fluid transport. Consequently, pumps can transport bitumen froth displaying sufficient lubricity long distances up to, for example, 150 Km. Centrifugal or positive displacement pumps may be used for froth transportation; positive displacement pumps are preferred for long distances.

The pipeline infrastructure for transporting different streams is preferably provided with tailored construction and configuration. For instance, pipeline infrastructure for transporting solvent recovered tailings produced by the regional PFT hub may include pipelines for transporting the tailings to proximate pond disposal; to dewatering and drying facilities; to treatment units for recovering valuable minerals from the tailings, such as titanium and other metals. The treatment units may be provided proximate to the regional PFT hub for recovering mineral from a number of different by-product streams of oil sands processing. The pipeline infrastructure may also include regional transportation corridors to regroup pipelines of different stream together to enhance efficiencies related to monitoring, leak detection and safety systems, as well as to focus mitigation systems and controls. The pipeline infrastructure may also be configured or routed to minimize river crossings. Pipelines for water, diluted bitumen and other light hydrocarbons can interconnect operations over long distances and facilitate transfer of bitumen hundreds of kilometers for remote use.

The relative location of the facilities may also be influenced by the location of leases, oil sands ore bodies, bitumen distribution and fresh water. Referring to FIG. 6, there may be multiple leases with different lease owners (A, B, C) with a single regional PFT hub 22 receiving bitumen froth from several mining and extraction operations 10 on different leases and then supplying hot bitumen to local upgrader 48 and remote upgrader 51.

In other embodiments of the present invention, the regional PFT hub may be strategically located based on proximity to developable or recoverable oil sands bitumen. Current practice is focused on short-term recoverable bitumen using mature or even outdated recovery techniques, thus discounting or overlooking significant confirmed hydrocarbon reserves. In an embodiment of the present invention, the regional PFT hub is provided a location accounting for large bitumen deposits that will be recoverable via advanced recovery techniques. Technology in oil sands bitumen recovery has advanced significantly, making previously unrecoverable reserves economically recoverable. However, many of such recovery technologies are at lab or pilot scale due to high development cost or industry focus on short-term developments. An embodiment of the present invention provides PFT hub location based on mid-term or long-term development strategies for recovering bitumen and hydrocarbons from oil sands formations. For instance, the regional PFT hub may be located closer to massive confirmed bitumen reserves, which may be recoverable through a combination of in situ and mining techniques, than less extension but more accessible bitumen reserves that are recoverable by mature and conventional means. This forward-looking approach allows a regional PFT hub to have an extended useful lifetime for processing bitumen froth derived from oil sands formations or varying accessibility in a same region, saving on massive capital costs required for pipeline infrastructure or PFT facility construction.

The region of Northern Alberta, for instance, has massive confirmed resources. The regional PFT hub provides a focal point for raw bitumen from various producers and sites to link with local upgraders and a terminus for pipelines to remote upgraders, accompanied by minimization of local developments and overall footprint.

In other embodiments of the present invention, the regional PFT hub may be located relative to other facilities such that certain process streams are advantageously provided with a desired level of pipeline energy input, shearing or mixing, thereby providing a given process stream with desired characteristics for downstream use, such as homogeneity, slurrification, aggregate or particle breakdown for a desired granulometry, heat, and so on. For instance, an aggregate-containing stream may be transported a sufficient distance to break down aggregates into a size that is manageable for downstream injectors or equipment; or a fine tailings stream may be homogenized for downstream flocculation or dewatering treatments that favor a homogeneous, uniform composition of the tailings. The PFT hub may be located relative to such equipment or treatment facilities to enable a sufficient or desired amount of pipeline pretreatment processing.

Mining and extraction operations which provide bitumen froth to the regional PFT hub facility can include a number of operations either directly owned by the paraffinic froth treatment facility operator or independent to the owner. This permits capital and operating costs optimization.

Interconnecting water pipelines permits the reuse of water between different facilities, thereby minimizing river water demands. For instance, waste water from upgraders is used a process water make-up for mining and extraction.

In addition, the location of the regional PFT hub facility establishes a focal point for local and remote processing of bitumen.

According to embodiments of the process, various pipelining techniques may be employed to facilitate the integration of certain product or recycle streams. Pipeline technologies for bitumen froth, hot bitumen, tailings and water distribution have advanced and, according to embodiments of the present invention, facilitate enhanced integration configurations between plants, facilities and operations.

According to embodiments of the process, the specific needs for specialized trained personnel in the operation of paraffinic froth treatment facility are recognized and met.

According to embodiments of the process, there is an enhanced utilization of resources. The enhanced utilization recognizes different reliabilities between process operations and translates to increased utilization, efficiency, increased safety and reduced capital investment. Interconnection between the mining and extraction operations and the regional PFT hub facility also minimizes water and energy resources by facilitating maximum reuse and recycle of process affected waters and transfer of recoverable heat, and encourages and facilitates reuse of process contaminated waters within the region.

According to embodiments of the process, the staging of projects and developments is greatly facilitated. The process allows greater flexibility and options in staging projects. The development, exploitation and efficiency of mobile or fixed mining systems are dependent on bitumen froth treatment facilities and a central or regional PFT hub facility provides a local market for bitumen froth rather than being associated with dedicated upgrading operations. Oil sand resources vary in bitumen grades, overburden depth which affects the scale for which the bitumen resource can be extracted. Some large and relatively uniform ore bodies can be efficiently extracted using large fixed location extraction facilities; however, small ore bodies can only support smaller operations particularly were tailings disposal constraints limit the extent of land disturbance. In some cases, there may be high-grade bitumen located in many small "pockets", favoring the use of one or more small mobile oil sand extraction apparatuses to recovery the bitumen. The high-grade pockets may be exploited serially by a mobile oil sand extraction apparatus or in parallel by multiple apparatuses, or a combination thereof.

FIG. 2 shows another optional embodiment of the process, where the paraffinic froth treatment facility arrangement features the recovery of asphaltenes, dried minerals and tailing water as separate streams. Various technologies regarding the specific units and processes to achieve the desired stream production are available for this optional embodiment.

The mining and extraction operations located around the region would recover bitumen in the form of froth and place tailings materials, e.g. into small ponds. Both bitumen froth and recycled process water from tailings pond are transferred to the regional froth treatment hub. Storage tankage for bitumen froth and water (not illustrated) would be provided to facilitate pipeline operations. The tankage may be in the form of a tank farm where each tank receives froth from a dedicated mining a extraction operation or where common tanks receive froth from a number of sources.

The regional froth treatment hub recovers and produces dry bitumen from the input bitumen froth and the dry bitumen may be pipelined as hot bitumen to local upgraders. Note the asphaltene rejected by the paraffinic froth treatment hub debottlenecks the coking section of the existing upgraders. The dry bitumen may alternatively or also be diluted for pipelining to remote upgrading facilities, where a portion of the pipelining diluent could be partially upgraded bitumen.

Referring to FIG. 3, the regional PFT hub preferably receives bitumen froth from several mining and extraction operations and produces hot bitumen 46 for both local upgrading and pipelining for remote upgrading. The local upgrader may advantageously produce a partially upgraded bitumen component that can be used as diluent to facilitate pipelining of the other portion of hot bitumen to the remote upgrader.

Recycled process water from upgrading or mining and extraction may be used as cooling media in the regional PFT hub and then returned or distributed back to the mining and extraction operations, where appropriate, as pre-heated process water. The returned water may pass through a water trim heater to provide hot water for OPP operations. In some embodiments, the solvent recovery unit of the paraffinic froth treatment hub may be designed and operated to maximize the cooling water temperature for recycle and reuse. The inventory of recycle water in the system may be managed to minimize surface area of tailings ponds. For instance, a dedicated deep storage pond may be preferred over several shallow ponds. Waste water from the upgrading facilities may also provide make-up water for the mining and extraction operations. For instance, the solvent recovery unit of the PFT hub may require cooling of the flashed solvent.

The paraffinic froth treatment hub may use a two-stage froth separation apparatus or a three-stage setup. The tailings solvent recovery unit and the solvent recovery unit may also each include one, two or more vessels arranged in series or parallel to perform the desired separation.

The paraffinic froth treatment hub may produce separate asphaltene by-product stream derived from the froth separation apparatus, the tailings solvent recovery unit or another unit, and the resulting asphaltenes may be marketed as a product. Water may be recovered from tailings for recycle purposes and dried minerals may also be marketed for mineral values, for instance via interim stockpile or maximizing resource utilization.

Process water storage may be at one central location, such as a deep pond with minimum surface area, to minimize ponds over the region. This central pond strategy enables a focused approach for tailings dewatering and drying operations, resulting in reduced reclamation times.

Referring back to FIG. 3, it should be understood that the regional PFT hub may be located in order to receive bitumen froth from multiple mining and extraction operations 10 as well as an in situ bitumen recovery operation 56, as further described herein.

In another embodiment, the paraffinic froth treatment plant provides a local market for bitumen as froth with partial upgrading into a marketable bitumen product either local or remote.

In addition, various development regulations in oil sands focus on lease-specific projects to stand alone development plans. Embodiments of the process of the present invention provide a regional development advantage in terms of resource use efficiency, facility flexibility and reliability, local infrastructure, environmental impact, employment of labor skills, capital concentrations, and emergency preparedness.

The invention claimed is:

1. A process for regionalization of mining of bitumen-containing oil sands ore for extraction and conversion to produce dry bitumen, comprising:
   operating a plurality of separate oil sands ore mining and extraction facilities to produce separate bitumen froth streams;
   supplying at least a portion of each of the separate bitumen froth streams to a common paraffinic froth treatment (PFT) hub the bitumen froth streams to produce the dry bitumen.

2. The process of claim 1, wherein the plurality of separate oil sands ore mining and extraction facilities comprises at least one mobile mining and extraction facility.

3. The process of claim 1, further comprising:
   managing the relative flowrates of the bitumen froth streams to provide a generally constant bitumen froth supply to the PFT hub.

4. The process of claim 1, further comprising:
   operating a plurality of separate upgrading operations; and
   providing portions of the dry bitumen to the separate upgrading operations.

5. The process of claim 4, wherein at least one of the upgrading operations produces hot process water and wherein the process comprises recycling at least a portion of the hot process water as recycled water to at least one of the plurality of separate oil sands ore mining and extraction facilities.

6. The process of claim 1, further comprising:
providing a first portion of the dry bitumen to an upgrading operation; and
providing a second portion of the dry bitumen to a bitumen market pipeline.

7. The process of claim 6, further comprising:
producing a partially upgraded bitumen from the upgrading operation; and
adding a portion of the partially upgraded bitumen to the dry bitumen as diluent to facilitate pipelining of the dry bitumen in the bitumen market pipeline.

8. The process of claim 6, wherein the upgrading operation or the PFT hub or a combination thereof generates by-product water and the by-product water is recycled for use in at least one of the mining and extraction operations.

9. The process of claim 1, further comprising:
providing a safety hub with volatile hydrocarbon emergency capabilities associated with the PFT hub.

10. The process of claim 1, further wherein the separate bitumen froth streams from the plurality of separate oil sands ore mining and extraction facilities have different contents of salt and water and the PFT hub removes the salt and water therefrom to produce the dry bitumen.

11. The process of claim 1, further comprising:
providing tank storage for receiving and storing the bitumen froth streams prior to introduction into the PFT hub.

12. The process of claim 1, further comprising:
operating at least one in situ bitumen recovery operation to produce an in situ bitumen froth stream; and
providing the in situ bitumen froth stream to the PFT hub for conversion to part of the dry bitumen.

13. The process of claim 1, further comprising:
providing pipeline infrastructure for transporting the separate bitumen froth streams to the PFT hub, wherein the pipeline infrastructure comprises:
a first pipeline section for receiving one of the separate bitumen froth streams;
a second pipeline section for receiving an other one of the separate bitumen froth streams; and
a pipeline in fluid communication with the first pipeline section and the second pipeline section for receiving the one and the other of the separate bitumen froth streams and transporting the same to the PFT hub.

14. The process of claim 1, further comprising:
locating the PFT hub to minimize transportation heat loss from the separate bitumen froth streams;
locating the PFT hub to provide sufficient transportation mixing of the separate bitumen froth streams to facilitate paraffinic froth treatment thereof; or
locating the PFT hub to minimize transportation pumping energy requirements for transporting the separate bitumen froth streams.

15. The process of claim 1, further comprising:
locating the PFT hub in closer proximity to larger confirmed bitumen reserves than to smaller developed bitumen reserves, to allow construction and operation of additional bitumen recovery operations of the larger confirmed bitumen reserves to produce additional bitumen froth streams for transportation to and treatment in the PFT hub.

16. The process of claim 1, wherein the PFT hub produces a heated by-product hot water stream and the process comprises recycling at least a portion of the by-product hot water stream to at least one of the plurality of separate oil sands ore mining and extraction facilities.

17. The process of claim 1, wherein the PFT hub comprises at least two parallel processing trains.

18. The process of claim 17, wherein the at least two parallel processing trains are independently operable with respect to each other.

19. The process of claim 17, wherein each of the processing trains comprises:
a froth separation apparatus for separating the bitumen froth into diluted bitumen and solvent diluted tailings;
a tailings solvent recovery unit for separating the solvent diluted tailings into a recovered solvent component and a solvent recovered tailings component; and
a solvent recovery unit for separating the diluted bitumen into the dry bitumen, recovered solvent and recovered water.

20. The process of claim 17, further comprising:
blending the separate bitumen froth streams to produce a blended bitumen froth; and
supplying the a portion of the blended bitumen froth to each of the processing trains.

21. The process of claim 1, further comprising:
combining the separate bitumen froth streams to produce a combined bitumen froth;
storing the combined bitumen froth in a tank storage facility.

22. The process of claim 21, further comprising:
recirculating the combined bitumen froth in the tank storage facility to blend the combined bitumen froth.

23. The process of claim 1, wherein the PFT hub comprises treatment units for recovering additional substances from the bitumen froth.

24. The process of claim 23, wherein the treatment units are configured to recover asphaltenes from the solvent diluted tailings for reuse as fuel, to recover mineral compounds, or to recover compounds.

25. A process for integration of an oil sands ore mining and extraction facility, a paraffinic froth treatment (PFT) hub and a bitumen upgrading facility, comprising:
operating the oil sands ore mining and extraction facility to produce a bitumen froth stream;
supplying the bitumen froth stream to the PFT hub to produce a dry bitumen stream; and
providing a first portion of the dry bitumen stream to the bitumen upgrading facility and a second portion of the dry bitumen stream to a bitumen market pipeline.

26. A process for integration of an oil sands ore mining and extraction facility, a paraffinic froth treatment (PFT) hub and bitumen upgrading facilities, comprising:
operating the oil sands ore mining and extraction facility to produce a bitumen froth stream;
supplying the bitumen froth stream to the PFT hub to produce a dry bitumen stream; and
providing a first portion of the dry bitumen stream to a first bitumen upgrading facility and a second portion of the dry bitumen stream to a second bitumen upgrading facility,
wherein the first and second bitumen upgrading facilities are located at different distances from the PFT.

27. A process for regionalization of water distribution in an oil sands processing operations comprising mining of bitumen-containing oil sands ore for extraction and conversion to produce dry bitumen, comprising:
operating an oil sands ore mining and extraction facility to produce a bitumen froth stream and tailings water;
operating a paraffinic froth treatment (PFT) hub for receiving the bitumen froth stream to treat the bitumen froth stream to produce the dry bitumen and receiving a portion of the tailings water for cooling and heat recovery to produce heated PFT process water;

operating an upgrading facility for receiving and upgrading at least a portion of the dry bitumen from the PFT hub, the upgrading facility producing heated upgrading process water;

distributing a portion of the heated PFT process water, the heated upgrading process water, or a combination thereof, to the oil sands ore mining and extraction facility for use as extraction processing water to produce the bitumen froth stream.

28. The process of claim 27, wherein the upgrading facility is a first bitumen upgrading facility and wherein a second portion of the dry bitumen stream is supplied to a second bitumen upgrading facility, the second bitumen upgrading facility being located farther from the PFT hub than the first bitumen upgrading facility.

29. The process of claim 28, further comprising:
producing a partially upgraded bitumen from the first upgrading operation; and
adding a portion of the partially upgraded bitumen to the dry bitumen as diluent to facilitate pipelining to the second bitumen upgrading facility.

30. The process of claim 27, further comprising:
operating a plurality of the oil sands ore mining and extraction facilities to produce a plurality of the bitumen froth streams;
operating the paraffinic froth treatment (PFT) hub for receiving at least a portion of each of the plurality of the bitumen froth streams and treating the bitumen froth streams to produce the dry bitumen.

31. The process of claim 27, further comprising providing the heated PFT process water, the heated upgrading process water, or the combination thereof, used in the oil sands ore mining and extraction facility, such that caustic is unnecessary for extraction in a Clark Hot Water Process.

32. The process of claim 27, further comprising:
operating at least one in situ bitumen recovery operation to produce an in situ bitumen froth stream;
providing the in situ bitumen froth stream to the PFT hub for conversion to part of the dry bitumen.

33. A process for regionalization of recovering bitumen from bitumen-containing oil sands formations for extraction and conversion to produce dry bitumen, comprising:
operating an in situ thermal bitumen recovery facility to produce an in situ bitumen froth stream;
operating an oil sands ore mining and extraction facility to produce an extracted bitumen froth stream; and
supplying at least a portion of each of the in situ bitumen froth stream and the extracted bitumen froth stream to a common paraffinic froth treatment (PFT) hub and treating the in situ and extracted bitumen froth streams to produce the dry bitumen.

34. The process of claim 33, wherein the in situ thermal recovery facility is selected from SAGD, SAGP, ES-SAGD, VAPEX, ET-DSP, and ISC facilities.

35. The process of claim 33, further comprising:
managing the relative flowrates of the in situ bitumen froth stream and the extracted bitumen froth stream to provide a generally constant bitumen froth supply to the PFT hub.

36. The process of claim 33, further comprising:
operating a plurality of separate upgrading operations; and
providing portions of the dry bitumen to the separate upgrading operations.

37. The process of claim 33, further comprising:

providing a first portion of the dry bitumen to an upgrading operation; and
providing a second portion of the dry bitumen to a bitumen market pipeline.

38. The process of claim 37, further comprising:
producing a partially upgraded bitumen from the upgrading operation; and
adding a portion of the partially upgraded bitumen to the dry bitumen as diluent to facilitate pipelining of the dry bitumen in the bitumen market pipeline.

39. The process of claim 33, further comprising:
providing a safety hub with volatile hydrocarbon emergency capabilities associated with the PFT hub.

40. The process of claim 33, further wherein the in situ bitumen froth stream and the extracted bitumen froth stream have different contents of salt and water and the PFT hub removes the salt and water from therefrom to produce the dry bitumen.

41. The process of claim 33, further comprising:
providing tank storage for receiving and storing the in situ bitumen froth stream and the extracted bitumen froth stream prior to introduction into the PFT hub.

42. The process of claim 33, further comprising:
providing pipeline infrastructure for transporting the in situ bitumen froth stream and the extracted bitumen froth stream to the PFT hub, wherein the pipeline infrastructure comprises:
a first pipeline section for receiving the in situ bitumen froth stream;
a second pipeline section for receiving the extracted bitumen froth stream;
a third pipeline in fluid communication with the first pipeline section and the second pipeline section for receiving both of the bitumen froth streams and transporting the same to the regional PFT hub.

43. The process of claim 33, further comprising:
locating the PFT hub to minimize transportation heat loss from the in situ bitumen froth stream.

44. The process of claim 33, further comprising:
locating the PFT hub closer to larger confirmed bitumen reserves than to smaller developed bitumen reserves, to allow construction and operation of additional bitumen recovery operations of the larger confirmed bitumen reserves to produce additional bitumen froth streams for transportation to and treatment in the PFT hub.

45. The process of claim 44, wherein the larger confirmed bitumen reserves comprise in situ recoverable bitumen reserves.

46. The process of claim 33, wherein the PFT hub comprises at least two parallel processing trains.

47. The process of claim 46, wherein the at least two parallel processing trains are independently operable with respect to each other.

48. The process of claim 47, wherein each of the processing trains comprising:
a froth separation apparatus for separating the bitumen froth into diluted bitumen and solvent diluted tailings;
a tailings solvent recovery unit for separating the solvent diluted tailings into a recovered solvent component and a solvent recovered tailings component; and
a solvent recovery unit for separating the diluted bitumen into the dry bitumen, recovered solvent and recovered water.

49. The process of claim 46, further comprising:
blending the in situ bitumen froth stream and the extracted bitumen froth stream to produce a blended bitumen froth; and supplying the a portion of the blended bitumen froth to each of the processing trains.

* * * * *